(12) United States Patent
Cloud et al.

(10) Patent No.: US 6,856,747 B2
(45) Date of Patent: Feb. 15, 2005

(54) FIBER OPTIC CABLE CLOSURE AND ASSEMBLY

(75) Inventors: Randy G. Cloud, Mentor, OH (US); Keith A. Miller, Twinsburg, OH (US); Marcel G. Mures, Mayfield Heights, OH (US); Jose Antonio Rivero Garcia, Seville (ES)

(73) Assignee: Preformed Line Products Company, Mayfield Village, OH (US)

( * ) Notice: Subject to any disclaimer, the term of this patent is extended or adjusted under 35 U.S.C. 154(b) by 0 days.

(21) Appl. No.: 10/478,928

(22) PCT Filed: Feb. 27, 2002

(86) PCT No.: PCT/US02/05975
§ 371 (c)(1),
(2), (4) Date: Nov. 25, 2003

(87) PCT Pub. No.: WO02/097488
PCT Pub. Date: Dec. 5, 2002

(65) Prior Publication Data
US 2004/0156611 A1 Aug. 12, 2004

Related U.S. Application Data
(60) Provisional application No. 60/293,609, filed on May 25, 2001.

(51) Int. Cl.[7] .................................................. G02B 6/00
(52) U.S. Cl. .................................................... 385/135
(58) Field of Search ................................. 385/134–137

(56) References Cited

U.S. PATENT DOCUMENTS

| | | | | |
|---|---|---|---|---|
| 5,323,480 A | * | 6/1994 | Mullaney et al. | ............ 385/135 |
| 5,553,186 A | * | 9/1996 | Allen | ............... 385/135 |
| 5,556,060 A | * | 9/1996 | Bingham et al. | .............. 248/49 |
| 5,631,993 A | * | 5/1997 | Cloud et al. | .................. 385/135 |
| 5,644,671 A | * | 7/1997 | Goetter et al. | ............... 385/135 |
| 5,734,776 A | * | 3/1998 | Puetz | .......................... 385/134 |
| 5,825,964 A | * | 10/1998 | Goetter et al. | ............... 385/135 |
| 5,862,290 A | * | 1/1999 | Burek et al. | .................. 385/135 |
| 5,884,000 A | * | 3/1999 | Cloud et al. | .................. 385/135 |
| 5,884,001 A | * | 3/1999 | Cloud et al. | .................. 385/135 |
| 5,896,486 A | * | 4/1999 | Burek et al. | .................. 385/135 |
| 5,949,022 A | * | 9/1999 | Park et al. | ................. 174/77 R |
| 6,304,707 B1 | * | 10/2001 | Daems et al. | ................ 385/135 |
| 6,507,691 B1 | * | 1/2003 | Hunsinger et al. | ........... 385/135 |
| 6,721,483 B2 | * | 4/2004 | Grubish et al. | .............. 385/135 |

FOREIGN PATENT DOCUMENTS

| | | | |
|---|---|---|---|
| DE | 43 21 814 A1 | * | 1/1995 |
| JP | 10-14081 | * | 1/1998 |
| JP | 2001 100050 | * | 4/2001 |

* cited by examiner

Primary Examiner—Javaid H. Nasri
(74) Attorney, Agent, or Firm—Fay, Sharpe, Fagan, Minnich & McKee, LLP

(57) ABSTRACT

A cable closure assembly includes a rotatable collar secured to an end plate for rotating the end plate with respect to the closure. Drop ports and express ports are provided within the end plate to accommodate either cut or uncut cables within the closure. Grommet and cap tools are provided which consist of two pieces to be installed over cables after the cables are inserted into the closure. A modular closure system is provided including a dome closure and extender or expander closures to increase storage and splicing area within the dome closure. A sliding and locking bracket allows for movement and pivoting of splice trays to access splice trays below other stacked trays. An extender for a strength member bracket accommodates various lengths of strength members on the cable fiber cable. A bracket on an end of a rigid bar member permits wrapping of the cable within the closure and positions the cable within the closure.

63 Claims, 20 Drawing Sheets

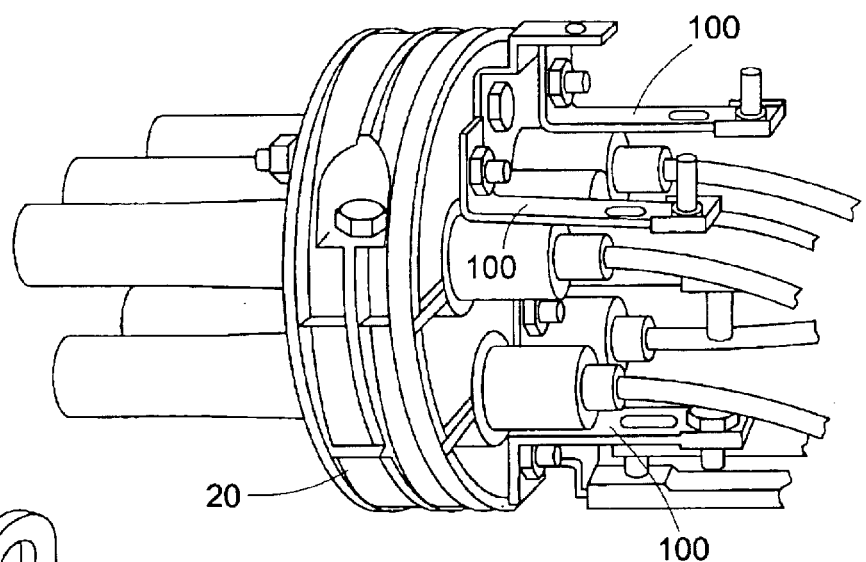
FIG. 12A
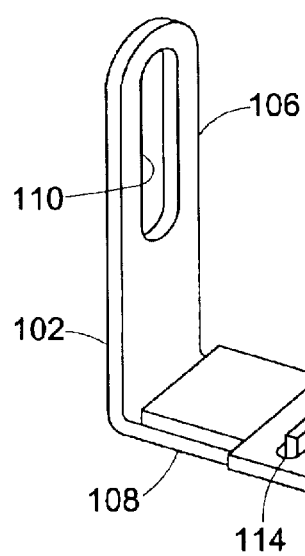
FIG. 12B
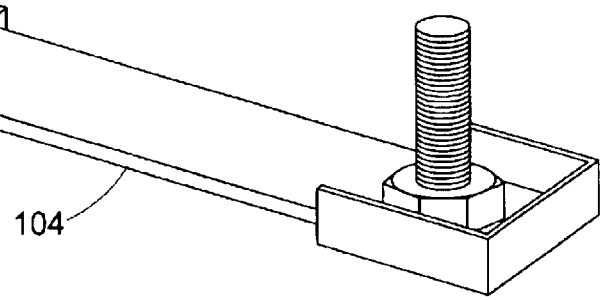
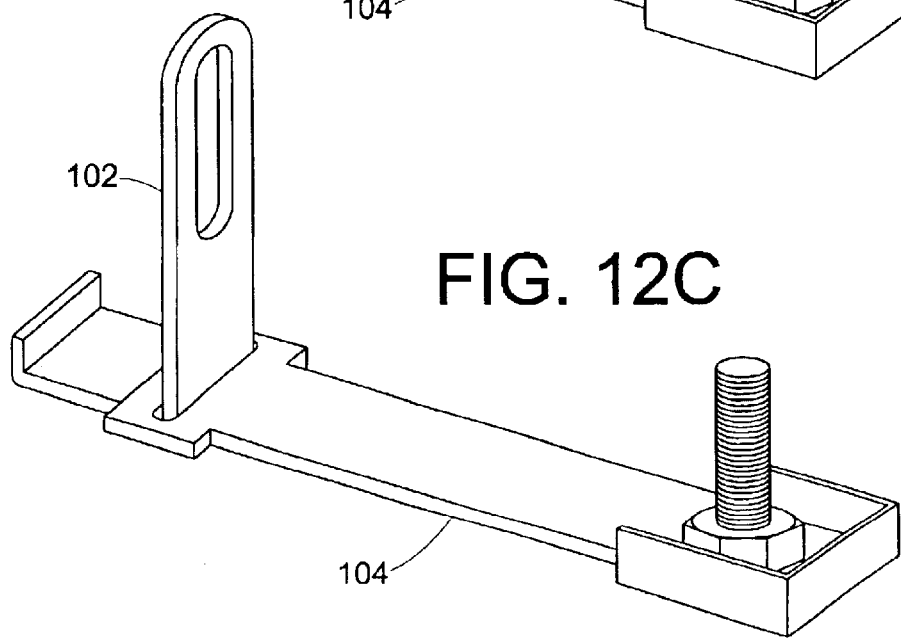
FIG. 12C

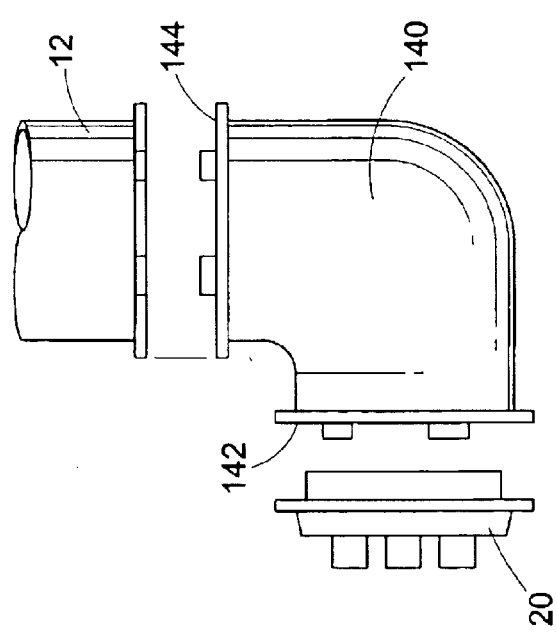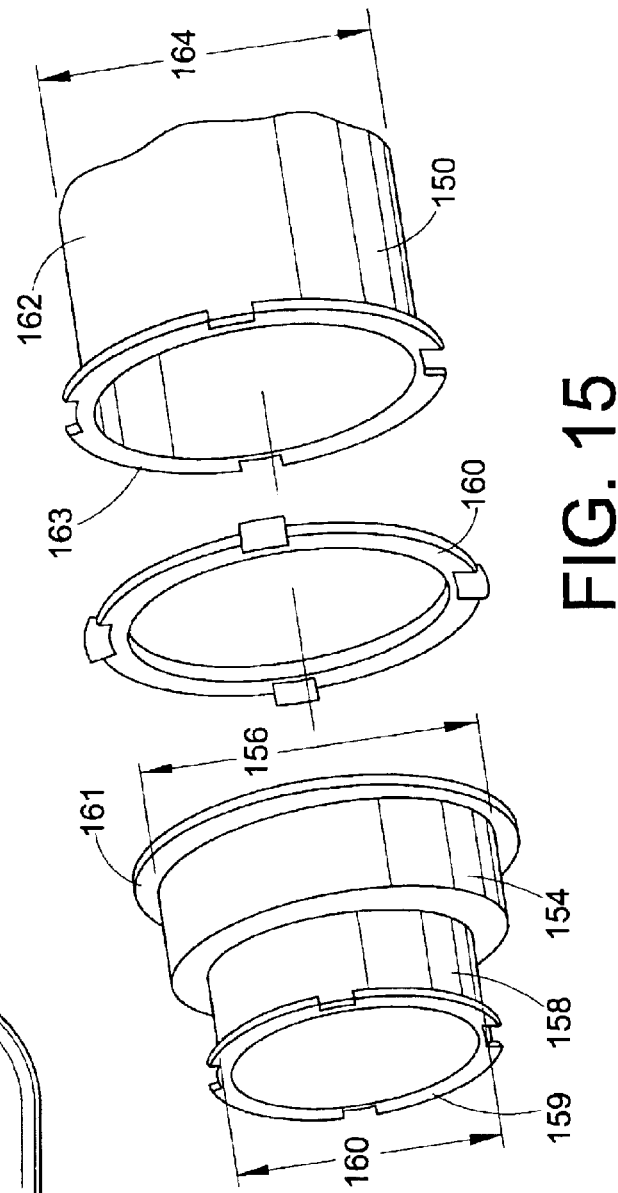
FIG. 14
FIG. 15

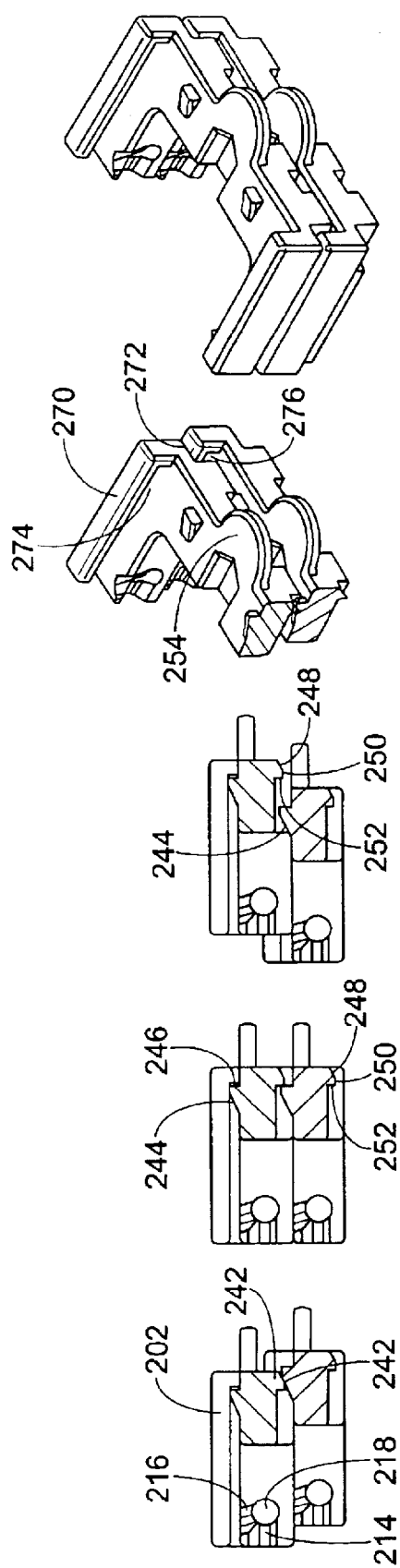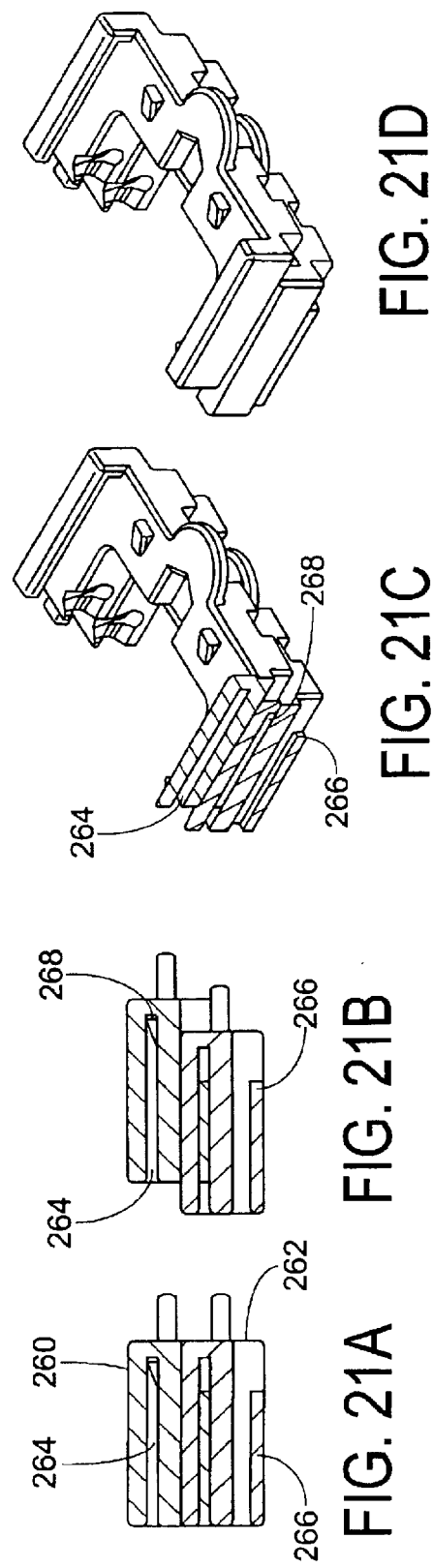

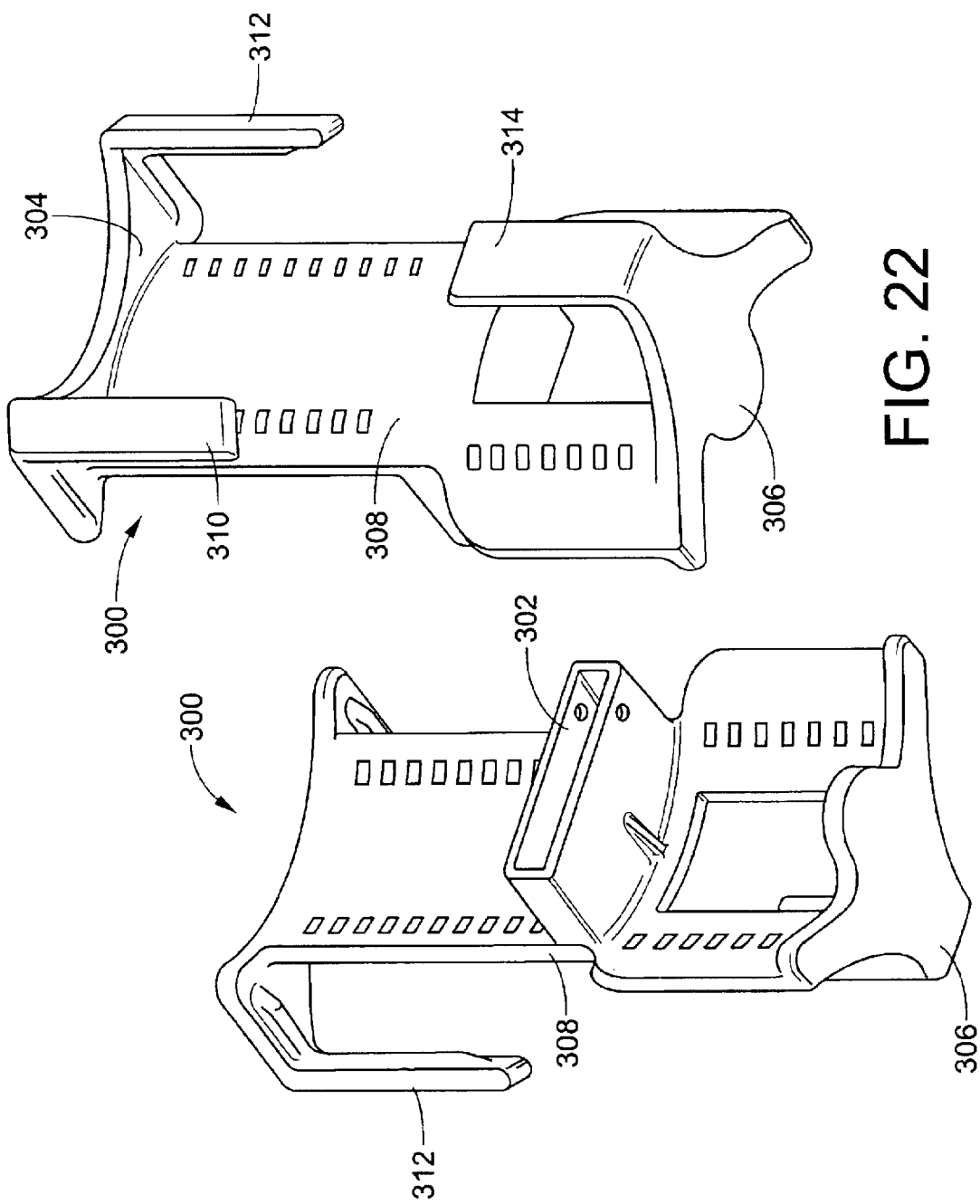

FIBER OPTIC CABLE CLOSURE AND ASSEMBLY

CROSS REFERENCE TO RELATED APPLICATION

This application claims priority from Provisional Application No. 60/293,609, filed May 25, 2001.

BACKGROUND OF THE INVENTION

The present invention is directed to a cable splice enclosure assembly. Assemblies of the type under consideration are particularly suited for enclosing and housing fiber optic splice cables, and the invention will be described with particular reference thereto; however, the apparatus could equally well be used with other types of cables.

Many different types of cable enclosures are known in the prior art. These prior enclosures are satisfactory to a greater or lesser degree but often have certain limitations which make them inconvenient to use or prevent them from being readily adaptable to changing environments and conditions. It is, accordingly, a primary object of the present invention to provide a cable enclosure assembly that is easy to assemble and use and which can be modified or adapted for different size cables and can be formed in a variety of different sizes that allow the size and number of splices to vary. In addition, the present invention provides an enclosure that allows ready access for changing or adding to the number of splices in the enclosure. It is also an object of the present invention to provide an end plate which is designed to receive various size cables without requiring drilling or modification during field use.

Access to ports within an end plate of existing cable closures requires the entire closure to be moved or rotated. This proves to be a time consuming and cumbersome process. Accordingly, it is desirable to provide a cable enclosure which has a rotatable end member which allows rotation of an end plate to access various ports and cables prior to locking the end plate to a cable closure and provide for easy assembly/disassembly.

It is desirable to provide an end plate system having ports which are separated by a slot to allow installation of uncut fiber cables within the closure.

Existing grommets and caps require that the cable be inserted through the grommet and cap and into the closure port. It is a further object of the invention to provide grommets, caps and grommet tools and cap tools which are split or have first and second halves which allow the grommets, caps and tools to be installed over a cable after a cable is installed within the closure.

It is also desirable to provide an extender which is installed onto a closure to form a modular system which allows an existing closure to have additional area along a longitudinal axis for storing and/or splicing cables. It is further desirable to provide an expander which allows a cable closure of a greater diameter than an end plate to interface with the end plate.

It is also desirable to provide a bracket on an end of a management bar which allows for wrapping the cable within the management system and controlling the position of the cable.

It is also desirable to provide a splice tray support system which allows the splice trays to be stacked on top of each other and slid and locked into a pivoted position to allow access to lower splice trays.

Accordingly, it has been considered desirable to develop a new and improved cable closure assembly which overcomes the foregoing difficulties and others while providing better and more advantageous overall results.

SUMMARY OF THE INVENTION

The present invention relates to a cable closure and assembly. More particularly, it relates to a cable closure system of the type used with fiber optic cables. The cable closure system is not limited to use with optical fibers and can also be used with other cables and cable types, such as copper cables, or the like. Although the expression optical will be used herein to describe the preferred embodiment, it is intended to include all stranded items and all cable types.

The optic fiber splice closure has an elongated generally cylindrical housing with an open first end having a flange and a closed second end. The housing forms a dome having a plurality of radially extending ribs formed on an outer surface thereof. An end plate is releasably secured to an open end of the housing. A rigid bar member has opposite terminal ends where one of the ends is joined with the end plate. An optical cable splice tray is mounted on the rigid bar member. A rotatable collar matingly engages the flange and secures the end plate to the housing first end. A seal member is positioned between the flange and the end plate to seal the end of the housing.

The collar has a plurality of circumferentially spaced tabs and the flange has a plurality of spaced apart notches where the tabs align with and engage the notches. The tabs and notches are preferably equally spaced apart. The tabs of the collar each have a body and a leg extending from the body, where the collar is rotated until the notches are positioned between the body and the legs of the tab thereby locking the collar with the flange.

The collar further has a plurality of ridges that engage a circumferential edge of an end plate to retain the end plate to the collar. The collar is also provided with a second leg where the second leg and the ridge form a channel for receiving the edge of the end plate. The end plate is rotatable with respect to the collar.

The closure system further includes a first housing member and a second cylindrical housing member having a first open end, a second open end, and a cavity extending therebetween. The second housing member is selectively sealingly locked to the first housing member. A collar engages and secures the second housing member with first housing member. The second housing member extends generally along a longitudinal axis of the first housing member. The first housing member and second housing member can have substantially the same diameter. Each of the housing members has a first flange which are matingly interconnected to each other. The second housing member further has a second flange on an end opposite to the first flange. A second collar is rotatably secured to the second end of the second housing along with an end plate.

Alternatively, the second housing has a body which configures to a substantially L-shaped configuration. The first and second ends are approximately normal to each other. Alternately, the second housing member has a body which is substantially U-shaped and the first and second ends are substantially parallel to each other.

According to another aspect of the invention, the first and second housings each have a first diameter portion which is substantially the same and the second housing further has a second diameter portion. The second housing has a step configuration formed between the first and second diameter portions wherein the first diameter portion is larger than the second diameter portion. The end plate is secured to an end of the second housing adjacent the second diameter portion.

The end plate assembly has a plurality of drop ports for use with cut fiber cable and a plurality of express ports for use with uncut fiber cable. The drop ports each have webbed material which covers an opening of each of the ports. At least one ground wire port is provided for receiving grounding wire. The ground wire part can have webbed material within an opening of the port.

Grommets are inserted into the drop and express ports to provide a seal between a cable and the ports. Caps are installed into the ports to secure the grommets into place.

A slot can be formed between and connect two adjacent express ports to accommodate a looped uncut fiber cable portion. A wedge-shaped insert is inserted into the slot to seal and retain the cable portion within the closure.

The grommets can be split and installed over the cable which is already within the port.

The grommet driver can have a first half and a second half with grooves and ribs which matingly engage each other to allow the grommet driver to be installed over a cable.

The caps can have a first semi-circular section and a second semi-circular section where the first section has a pair of grooves extending along a longitudinal axis of the first section. The second section has a pair of ribs extending along a longitudinal axis of the second section. The grooves and ribs slidingly engage each other to allow the cap to be installed over a cable.

The cap tool can have a first body member and a second body member where each body member has a first end with teeth and a second end forming a handle. The first body member has at least one groove and the second body member has at least one rib which matingly engages the groove. The first and second body member are installed over a cable.

The cap further has a plurality of ribs formed on an outer surface of the first and second cap halves. The cap tool teeth engage the ribs and allow rotation of the cap within the port.

A splice tray and splice tray support system are provided which include an elongate rigid bar member, a post extending substantially perpendicularly from the bar member, a pair of support brackets upon which the rigid bar member is mounted, and one or more splice trays supported on the bar member which have a slotted end for selectively receiving the rod. A first support member is adapted to receive a second end of the splice tray. A second support member is mounted to the rigid bar member and is pivotally connected to the first support member. First support member has a body with a pair of arms extending therefrom which are parallel to each other. Each of the arms have a first and second groove. The first groove extends along the longitudinal axis of the arms. The second groove extends from the first groove at an acute angle with respect to the longitudinal axis. A circular cutout or groove is formed at the intersection of the first and second grooves.

The second support member also has a body with first and second arms extending from the body which are generally parallel to each other. Each of the second support member arms has a tab extending from a sidewall in the arm. The tabs are received by one of the first and second grooves in a corresponding first support member. The second support member is pivoted from a first, horizontal position to a second, angled position and is locked into the second position. A tab of the second support member engages the circular cutout in the first support member and locks the second support member in one of the first and second positions.

The second support members can each further have an alignment pin on a first surface and a hole on a second surface which receives the pin of an adjacent second support member. Each of the first support members can have a tab which extends from the body for providing manual gripping of the support member.

Each of the first support members has a first locking tab on a first surface and a second locking tab on a second surface. The first locking tab engages a second locking tab of an adjacent first support member when the first support members are in a stacked relationship to each other. One of the first support members is slid with respect to an adjacent first support member to disengage the locking tabs. The first locking tabs each have a ramped surface and a straight, vertical surface which extends from the ramped surface. The second locking tab has a ramped surface, a landing and a straight, vertical surface which extends from and is approximately normal to the landing.

Alternately, the first support members can have slots extending along the longitudinal axis of the arms and ribs extending along the longitudinal axis of the arms where the ribs are spaced apart from the slots. A rib on one of the first support members slidingly engages a slot of an adjacent first support member when the first support members are in a stacked relationship. The slots of the first support member each have an end wall where the rib contacts the end walls to prevent further movement of the rib within the slots.

The first support member arm has first and second walls parallel to each other and third and fourth walls parallel to each other where the third and fourth walls are approximately normal to the first and second walls. The first wall of one of the first support members engages a second wall of an adjacent first support member and the third wall of a first support members engages the fourth wall of an adjacent first support member when the support members are in a stacked relationship.

The splice tray and splice tray support system can further have a "fanged" shape bracket positioned at an end of the rigid bar member and having an opening for receiving the end of the rigid bar member. The bracket has first and second horizontal walls which are generally parallel to each other where the second wall forms a base for the bracket. A third, vertical, curved wall connects the first and second walls to each other. Prongs extend downwardly from the first wall and a prong extends upwardly from the second wall. The prongs capture the wound cable.

One advantage of the closure system lies in the flexibility of cost and performance it provides. The closure can be configured in a multitude of ways to address a specific customer's needs.

Another advantage of the fiber optic closure is the provision of a rotatable collar which allows the end plate to be rotated so that various ports and cables may be accessed prior to locking the end plate onto the dome closure.

Yet another advantage lies in the provision of express ports with a slot therebetween which provides an opening for uncut fiber cable.

Yet another advantage lies in the provision of a dome closure system which is easily assembled and disassembled.

Still another advantage is the provision of a dome closure system which is modular and can include extenders and expanders to increase the amount of storage space within the closure.

Still yet another advantage is the provision of grommets, caps and tools which are split apart or are formed of two halves and are able to fit on a cable after the cable is already inserted and installed within the closure.

Yet still another advantage is the provision of a tool-less system for assembly of the closure system.

Another advantage of the present invention is the provision of a splice tray which has members which are slidable and lock into place in a pivoted position to allow access to lower splice trays in a stacked relationship.

Still yet another advantage of the present invention is the provision of a fang-shaped bracket which has flexible prongs which allow wrapping of the cable within the closure and maintains the cable within the closure.

Still other advantages and benefits of the invention will become apparent to those skilled in the art upon a reading and understanding of the following detailed description.

BRIEF DESCRIPTION OF THE DRAWINGS

The invention may take form in certain parts and arrangements of parts, the preferred embodiments of which will be described in detail in this specification and illustrated in the accompanying drawings which form a part hereof and wherein:

FIG. 12a is a perspective view of a strength member bracket mounted to the end plate;

FIG. 12b is a perspective view of a strength member bracket extender and strength member bracket;

FIG. 12c is a perspective view of a strength member extender and bracket of FIG. 12b with the strength member bracket extender rotated 180°;

FIG. 14 is a side elevational view illustrating an L-shaped extender used with a cable closure;

FIG. 15 is a perspective view illustrating a stepped configuration expander and a dome closure;

FIG. 20a is a side elevational view in cross-section of stacked support brackets with locking tabs in engagement;

FIG. 20b is a side elevational view in cross-section of two support brackets in a closed orientation;

FIG. 20c is a side elevational view in cross-section of two support brackets in an open orientation;

FIG. 20d is a perspective view in partial cross-section of two support brackets with locking pins in engagement;

FIG. 20e is a perspective view of two support brackets in a closed orientation;

FIG. 21a is a side elevational view in cross-section of two support brackets in a closed orientation according to an alternate embodiment;

FIG. 21b is a side elevational view in cross-section of the support brackets of FIG. 21a in an open orientation;

FIG. 21c is a side elevational view in partial cross-section of two support brackets of FIG. 21a illustrating engagement of a rib and a slot;

FIG. 21d is a side elevational view of two support brackets of FIG. 21a in an open orientation;

FIG. 22 is a perspective view of a fang bracket of the preferred embodiment; and, FIG. 23 is a cross-sectional view of a web removal tool of the preferred embodiment.

DETAILED DESCRIPTION OF THE PREFERRED EMBODIMENTS

Figure 1:
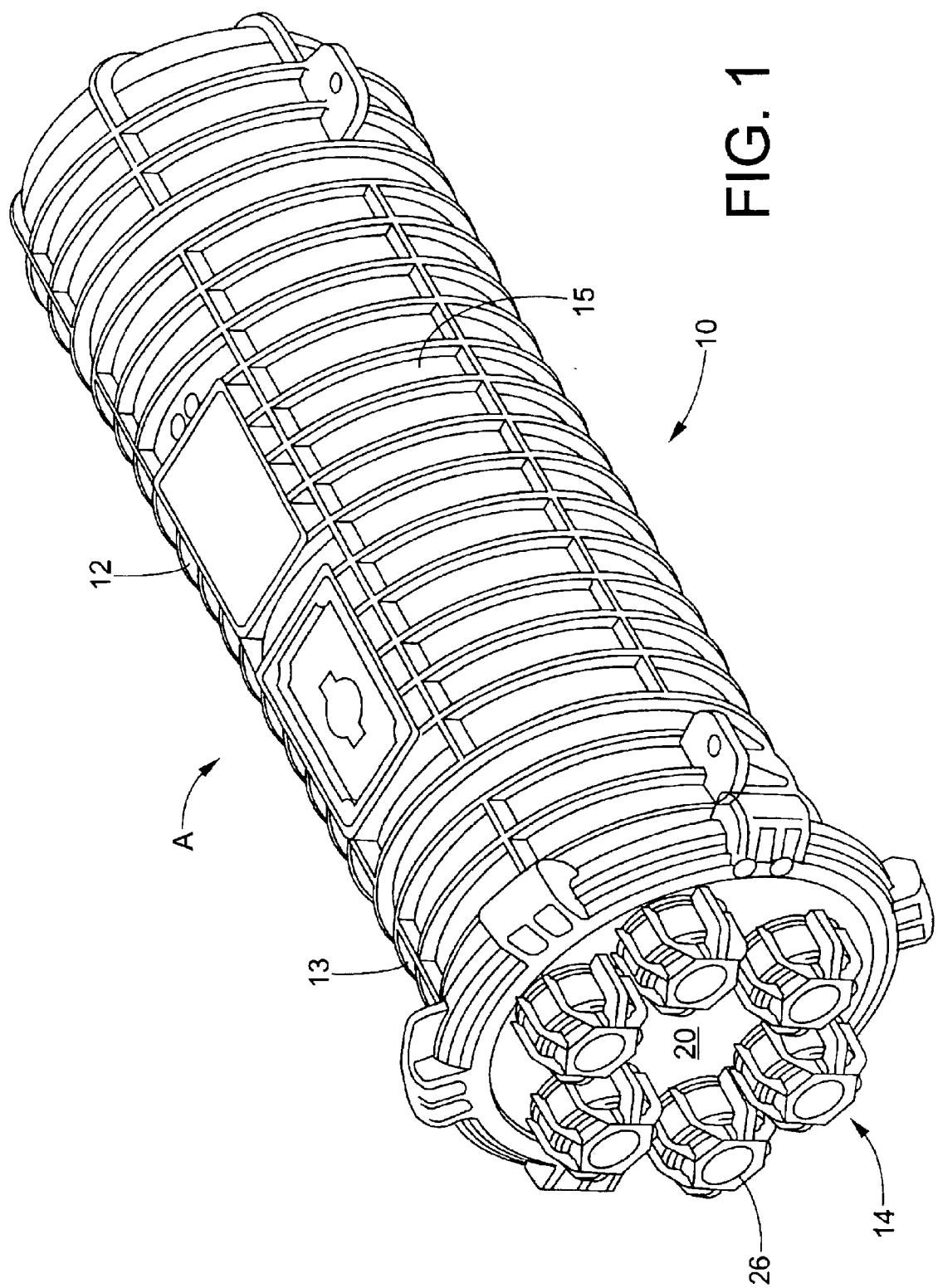
FIG. 1 is a perspective view of the fiber optic cable dome closure in accordance with a preferred embodiment of the present invention.

Referring to the drawings, wherein the showings are for purposes of illustrating the preferred embodiments of the invention only, and not for purposes of limiting same, FIG. 1 shows a fiber optic cable closure system A in accordance with a first embodiment of the present invention.

Figure 2:
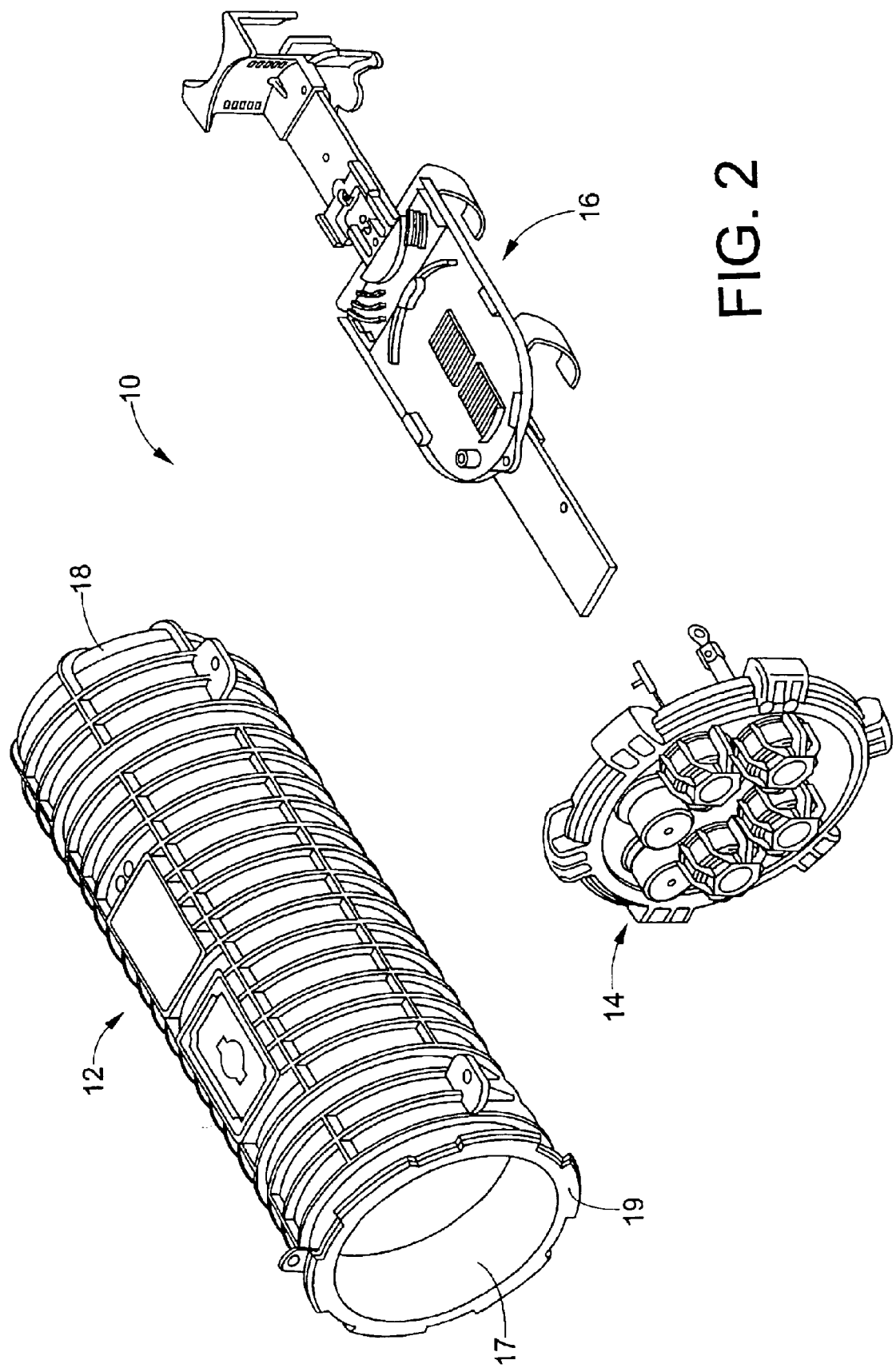
FIG. 2 is a perspective view illustrating an end plate and collar, a fiber optic splice tray system and the dome closure in accordance with a preferred embodiment of the present invention.

With particular reference to FIGS. 1 and 2, cable closure 10 includes a main body preferably in the form of a dome member 12, an end plate assembly 14 removably securable to the dome 12, and a splice tray management assembly 16 removably securable to the end plate assembly 14. The dome 12 forms an elongated, generally cylindrical housing which has a plurality of radially extending ribs 13 formed on an outer surface 15 thereof. In the embodiment being described, the dome is a unitary, one-piece structure with an open, first end 17, a closed, second end 18, and an internal cavity 19. The internal cavity can be sealed, pressurized, and/or potted as desired to protect the splice tray management assembly 16.

Although the dome closure body and components and the end plate assembly could be formed from a variety of different materials using different manufacturing techniques, in the subject embodiment, they are preferably injection molded from a suitable plastic containing fibers for reinforcement. For example, fiber glass filled and reinforced polypropylene is preferred.

Figure 3:
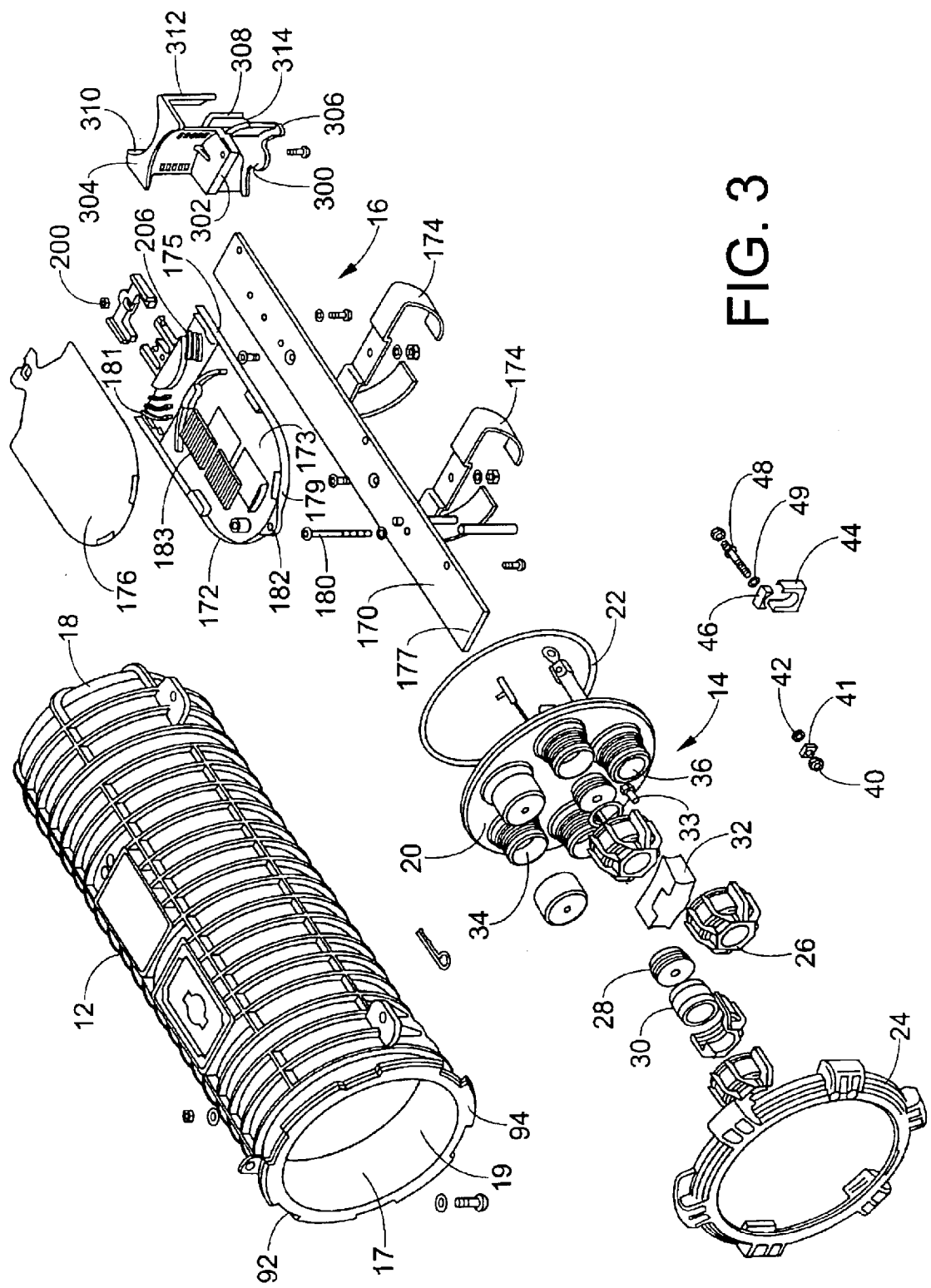
FIG. 3 is an exploded perspective view illustrating the fiber optic cable closure system in accordance with a preferred embodiment of the present invention.
Figure 4:
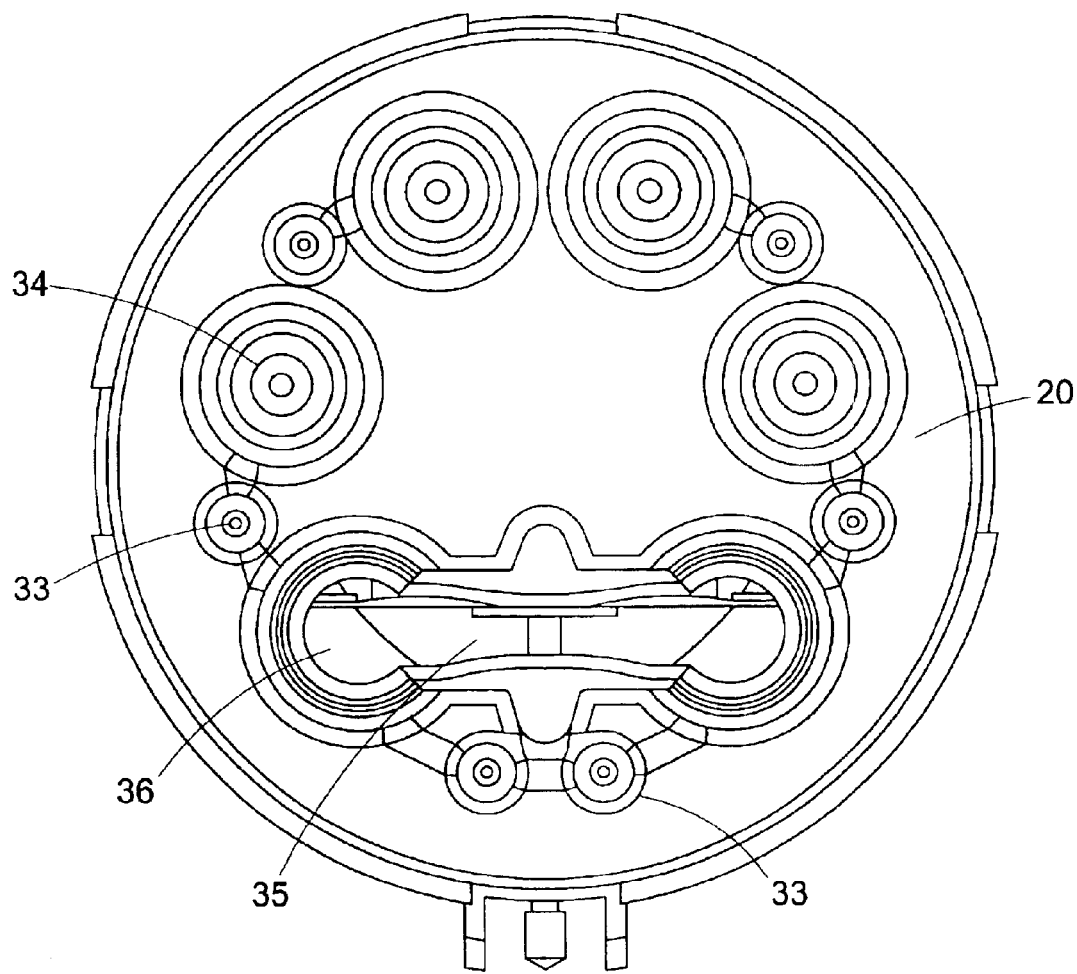
FIG. 4 is a front elevational view of an end plate of the closure system of the preferred embodiment.

Referring now to FIGS. 3 and 4, the end plate assembly 14 includes an end plate 20, a sealing O-ring or gasket 22 which surrounds a perimeter of the end plate to seal the end plate with the closure, a rotatable collar 24, a plurality of caps 26, a plurality of ribbed grommets 28, a plurality of grommet drivers 30, a wedged insert 32, and one or more ground wire hardware ports 33. The end plate 20 includes a plurality of cable ports including drop ports 34 for use with cut fiber cable, and express ports 36 for use with un-cut looped fiber cable. An inner diameter of each port 34, 36 tapers radially inward in a direction toward the dome 12. The tapered inner wall, in cooperation with the grommets 28, facilitates sealing the cables as they pass though the respective cable ports 34, 36. That is, as a cap 26 is threaded onto a cable port 34, the corresponding grommet driver 30 urges a grommet 28 axially into the port 34 between the cable and the port inner side wall. The point at which the grommet 28 sealingly engages the port inner side wall varies depending upon the diameter of the cable, the size of the grommet, and the taper of the inner side wall. As the caps are tightened, the grommets compress between the port walls and the cable, thereby providing a fluid tight seal therebetween.

Figure 5:
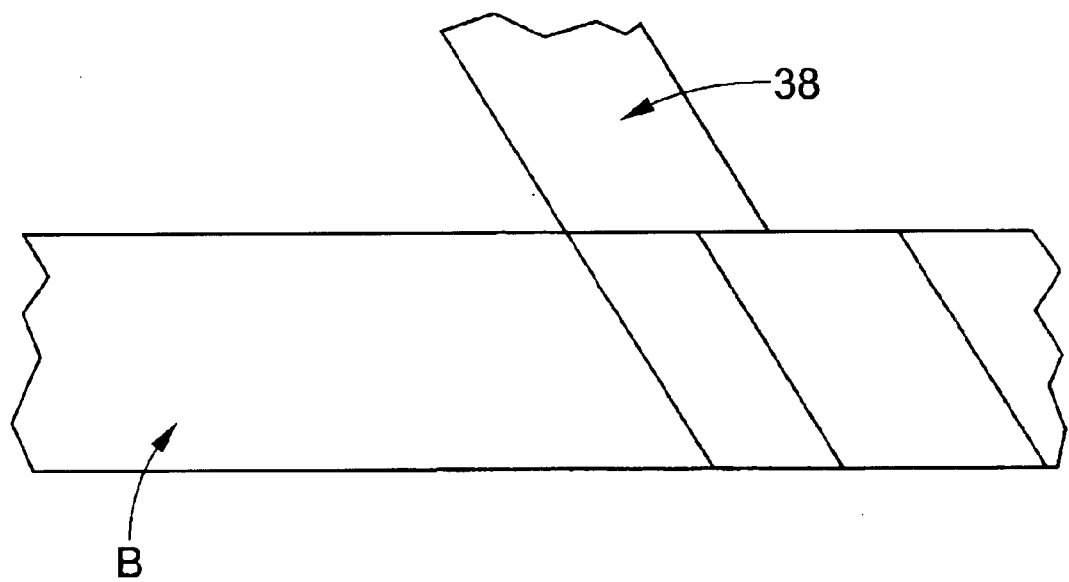
FIG. 5 is a side elevational view illustrating a gel-wrap material installed on a cable.

Alternatively, as shown in FIG. 5, the grommets 28 can be replaced with a gel wrap 38 wrapped around cable B to seal the drop ports 34, express ports 36, and/or grounding cable ports 33.

Figure 23:
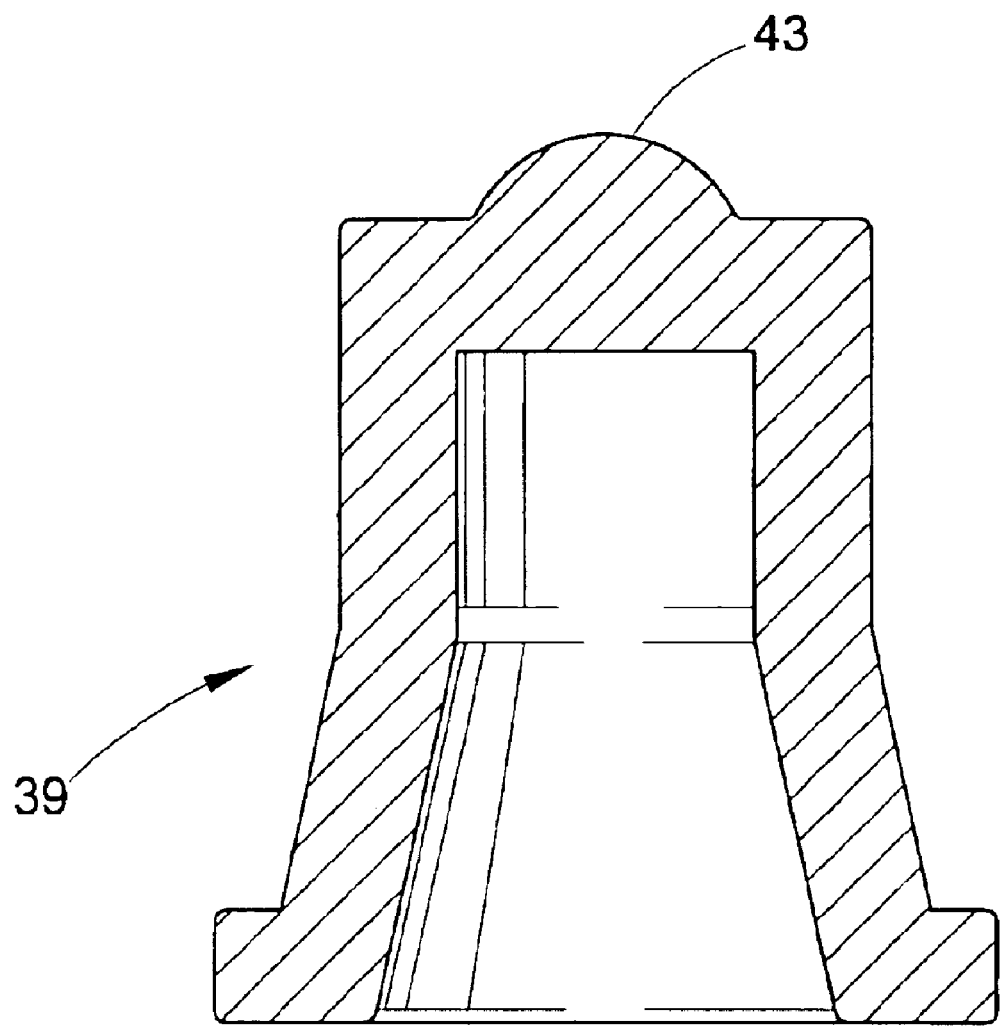

Further, a removable web of material is formed across the inner diameter of each cable drop port 34 during manufacture of the end plate 20. The lower ports 34 are thus usable as regular cable ports until such time as a craftsperson punches-out or otherwise removes the web of material. Accordingly, the dome inner cavity can be pressurized when less than the maximum capacity of cable spices are enclosed within the dome 12. And as capacity is increased, an unused port 34 can then be selected to accommodate an additional cable by simply knocking out the web of material. The webbed material can be removed or unlocked out of the port openings by a web removal tool 39, shown in FIG. 23, which has a chamfered or "bullet-tip" end 43 to further enhance knocking out the web material by concentrating the force required to dislodge the webbing.

The express ports 36 are primarily used for splicing to un-cut fiber optic cable. More particularly, a looped portion of the un-cut cable is fed into an open slot 35 (FIGS. 4 and 7) defined between two express ports 36. With such a looped cable portion fed through the slot 35 and adjoining express ports 36, the wedged insert 32 is then driven into the slot 35 to retain, in conjunction with grommets 28, drivers 30, and caps 26 that are secured to the express ports 36 as described above, the looped cable portion within the dome internal cavity. It should be appreciated that the slot and the wedged insert 32 can be keyed and/or ribbed to facilitate locking the wedged insert within the slot 35, thus preventing the wedged insert from shifting into one of the ports 36 and preventing a seal from being established.

It should be appreciated that the express ports 36 of the present invention can also be used to individually route additional cut cables to the dome inner cavity. Thus, when additional cut cable capacity is desired and there are no additional drop ports 34 available, the express cable ports 36 can be used as needed to route the additional cut cables into the dome.

The ground wire hardware port 33 is adapted to accommodate ground wire hardware such as the ground wire hardware 40, 41, 42, 44, 46, 48 and 49 shown in FIG. 3. More particularly, the grounding stud 48 projects through the hardware port 33 and electrically connects an external ground wire to, for example, the splice tray management assembly 16 within the dome internal cavity. Alternatively, as best shown in, for example, FIG. 4, a ground wire hardware port 33 can be individually associated with some or all of the cable ports 34, 36. As with the cable ports 34, 36, the ground wire hardware port(s) 33 include a web of material that preserves the ability to pressurize the dome internal cavity when a ground wire is not used. Otherwise, a craftsperson simply knocks-out the web in order to feed the grounding stud 48 through the respective ground wire hardware port 33.

Alternatively, it is contemplated that a ground wire may be fed through the ground wire hardware port 33 without the use of the identified hardware. In such a case, a grommet, such as grommet 28, can be used to seal a grounding cable that extends through a grounding cable port 33.

With a grommet 28 in place around a respective cable, the grommet driver 30, in conjunction with the threaded cap 26, urges the grommet 28 axially into sealing engagement between the cable and a tapered inner wall of a respective port 34, 36. The cap 26 is driven into the grommet and port by a cap tool or driver 50.

Figure 6:
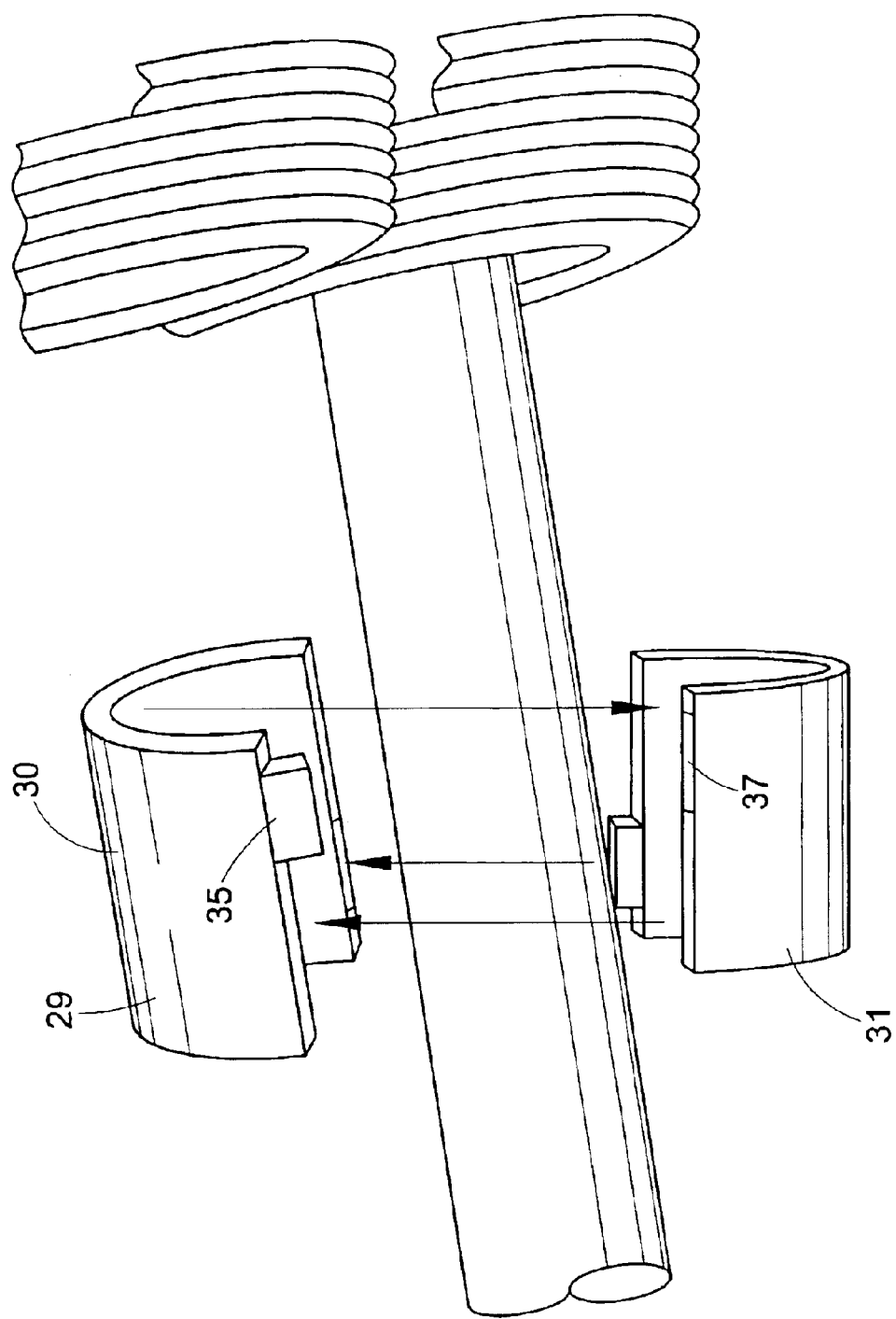
FIG. 6 illustrates a two-piece grommet driver being installed on a cable.

The grommets 28 can be of a solid one-piece construction or a split one-piece configuration. Referring to FIG. 6, the grommet driver 30 includes a first half 29 and a second half 31. Each half has a tab 35 and a slot 37. The tab 35 engages the slot 37 to install the first and second halves over a cable within one of the ports.

Figure 7:
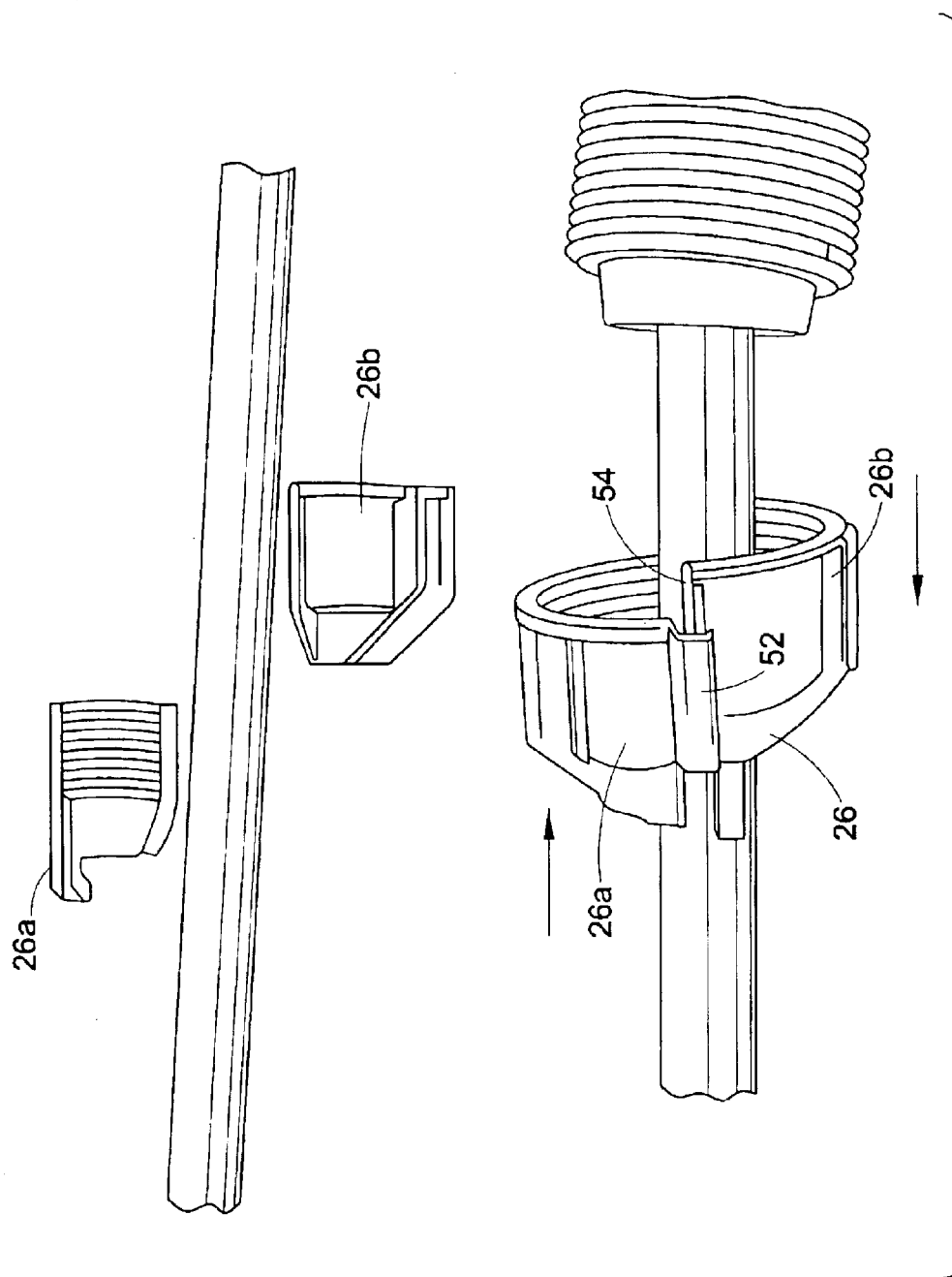
FIG. 7 is a side elevational view illustrating a two-piece cap being installed on a cable.
Figure 8:
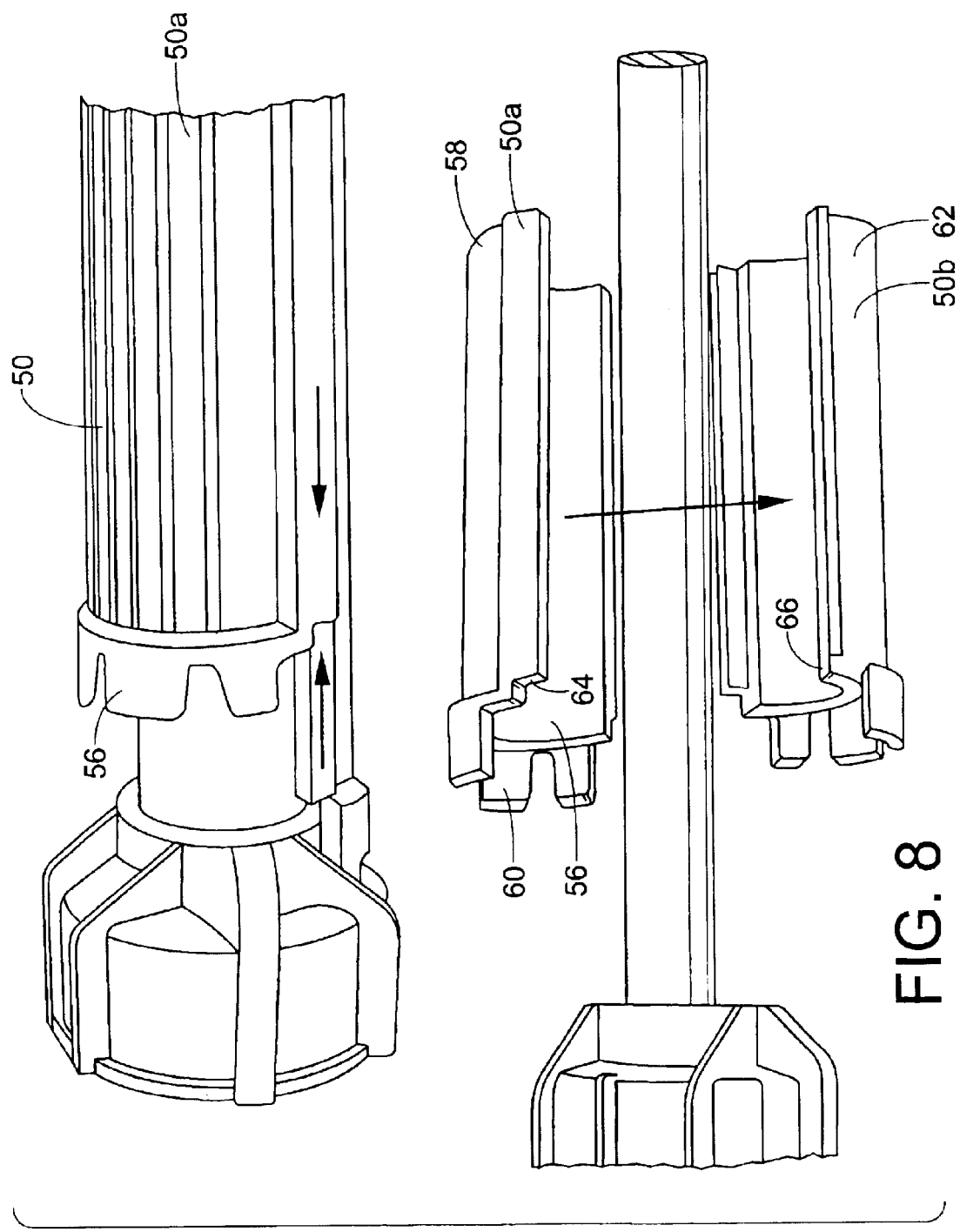
FIG. 8 is a side elevational view illustrating installation of a two-piece cap tool onto a cable.

It should be recognized that a cable end must be fed through a prior art one-piece grommet, whereas a split grommet 28 can be placed over any portion of a cable and then slid along the cable into threaded engagement with a port. Likewise, the cap drivers 50 and caps 26 can be one-piece solid or split, or, preferably, two-piece (as shown in FIGS. 7 and 8). Again, it should be recognized that a cable end must be fed through a solid one-piece cap driver 50 and a solid one-piece cap 26, whereas a split one-piece driver and cap, or a two-piece driver 50 and cap 26 can be placed over any portion of a cable. Referring to FIG. 7, plastic cap 26 has a first semi-circular section 26a and a second semi-circular section 26b. Section 26a has a pair of grooves 52 extending along a longitudinal axis of the first section. The second section has a pair of ribs 54 extending along a longitudinal axis of the second section. The grooves 52 and ribs 54 slidingly engage each other to connect the first section to the second section and allow the cap to be installed over an associated cable.

Referring to FIG. 8, the plastic cap tool 50 has a first body member 50a and a second body member 50b. Each member has a first end 56 and a second end 58. The first end 56 has a plurality of teeth 60 and the second end 58 forms a handle 62. The first body member has grooves 64 and the second body member has ribs 66 which matingly engage the grooves 64. The ribs 66 and grooves 64 releasably secure the first body member to the second body member to allow the cap driver to be installed over a cable.

Figure 9:
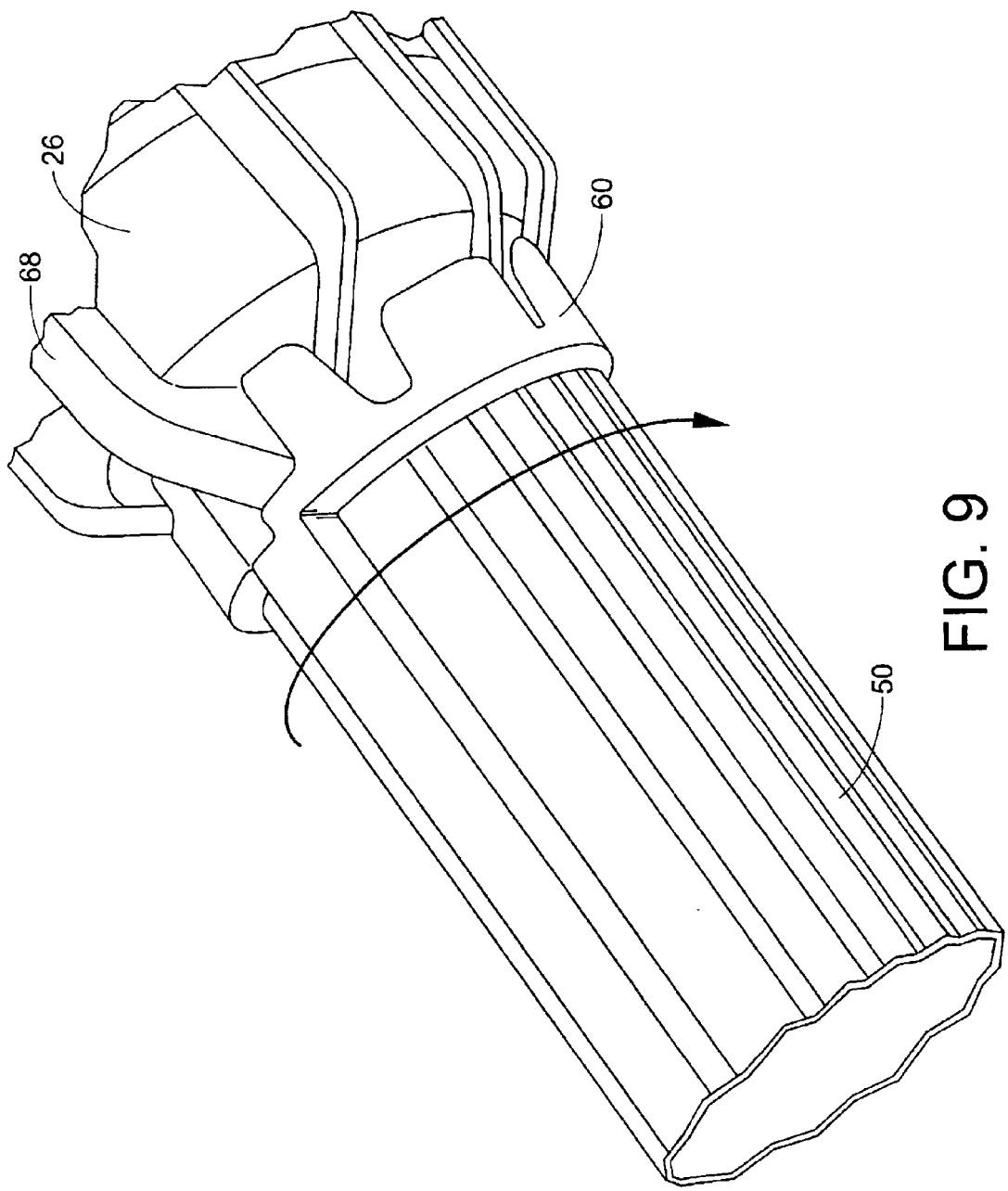
FIG. 9 is a perspective view illustrating a cap tool being used to install a cap onto the closure.

Referring to FIG. 9, each cap 26 has a plurality of ribs 68 formed on an outer surface thereof. The tool teeth 60 engage the ribs 68 and allow rotation of the cap relative to the ports 34, 36.

Figure 11:
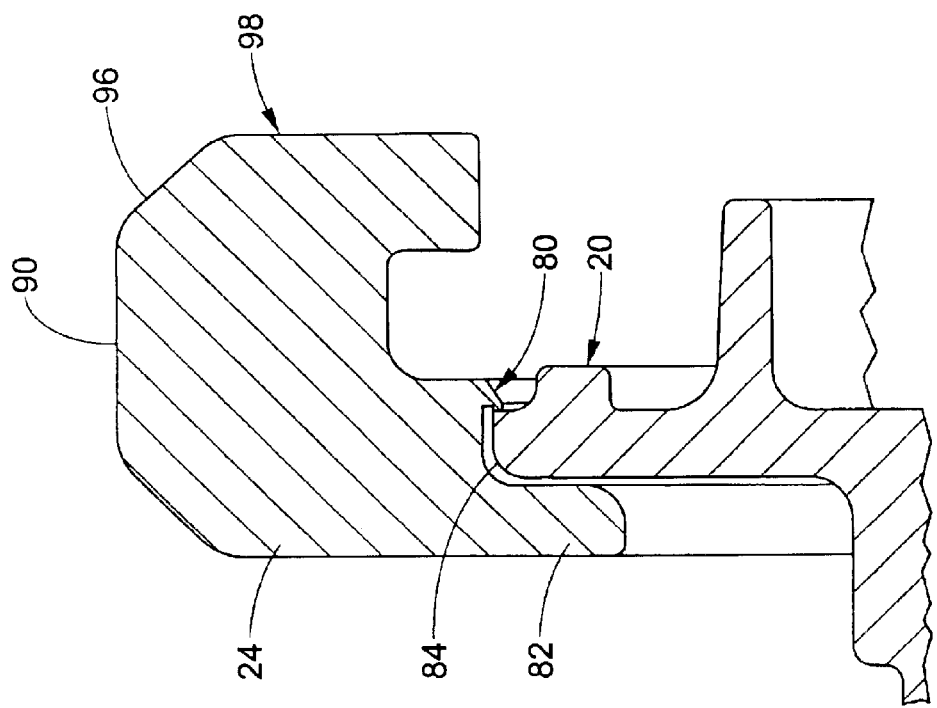
FIG. 11 is a cross-sectional side elevational view showing engagement of the end plate with the rotatable collar.
Figure 10:
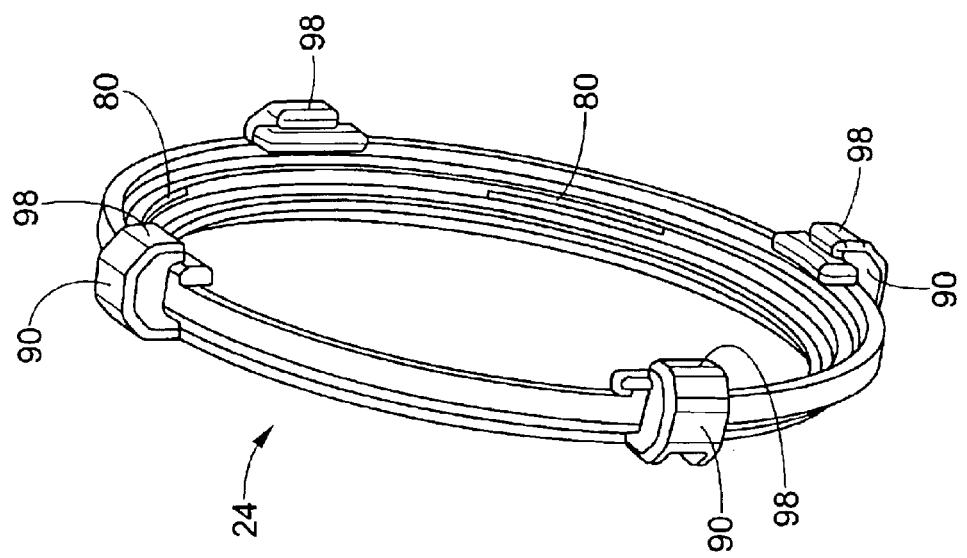
FIG. 10 is a perspective view of a rotatable collar used with the end plate of FIG. 4.

Referring now to FIGS. 3 and 10, the rotatable collar 24 can be a solid one-piece unit, a split one-piece unit, or multi-piece (e.g. two-piece) if desired. It should be appreciated that, during installation, cut cables must be fed through a solid one-piece collar, whereas, a split one-piece collar and a two-piece collar can be placed over the cables after splicing has occurred. As best shown in FIGS. 10 and 11, the collar 24 includes circumferentially spaced ramps or ridges 80 and legs 82 which form a channel 84 adapted to engage the circumference of the end plate 20 in a snap-fit arrangement to retain or otherwise loosely attach the end plate 20 with the collar 24. The ramps 80 limit the extent that the end plate 20 can travel axially relative to the collar 24. However, the end plate 20 is free to rotate relative to the collar 24 when the collar 24 is not locked to the dome 12. This facilitates rotationally positioning the cables and end plate 20 prior to locking the collar 24 to the dome 12.

With continued reference to FIGS. 10 and 11, the collar includes a plurality (e.g. 4–6) of circumferentially-spaced tabs 90 that correspond to a plurality of notches 92 in a mating flange 94 surrounding the dome open end (see FIG. 3). The tabs 90 are preferably equally spaced apart along a circumference of the collar. Similarly, the notches 92 can be equally spaced along a circumference of flange 94. Referring to FIG. 11, the tabs 90 comprise a body 96 and a leg 98 extending from the body. With the collar tabs 90 aligned with the notches 92, the collar and depending end plate 20 and seal 22 abuts the mating flange 94. The collar 24 can then be rotated so that notches 92 are positioned between bodies 96 and legs 98 of tabs 90 to lock and seal the end plate 20 to the dome free end.

Referring to FIG. 12a, the dome includes a cable strength member bracket 100 and a connecting opening associated therewith. The strength member brackets function to support the cable. To that end, typically, each fiber optic cable generally carries an elongated wire-like strength member intended to add strength to the cables or, more accurately, to the fiber transport tube within the cable. These strength members are cut away from the transport tubes after the cables pass into the enclosure. In order to anchor the cables to the closure, it is necessary to affix the strength members to the strength member brackets. Further, because the strength members expand and contract at a different rate than the fibers themselves, it is important that the movements of the strength member not be transmitted to the splices or the fibers. The strength member connecting brackets thus serve not only to firmly anchor the cables to the closures, but also to isolate the splices and fibers from movements caused by expansion and contraction of the strength member.

Referring to FIGS. 12b and 12c, an "L-shaped" extender 102 may be use with a strength member bracket 104. The extender 102 comprises a first portion 106 and a second portion 108 extending from and approximately perpendicular to the first portion. First portion 106 has an elongated slot 110 which accommodates a bolt or other fastening means for securing the extender to end plate 20. Second portion 108 has a flange or a lip 112 which protrudes through a slot 114 in the strength member bracket 104. Alternatively, the first portion 106 may be inserted into and extend through slot 114. The extender accommodates various lengths of strength members. The strength member bracket extender attaches to an existing bracket. The extender may be installed in one of two positions 180° apart, by changing the installation of the extender on the bracket from that shown in FIG. 12b to the configuration of FIG. 12c. The extender may be installed in the position shown in FIG. 12c to avoid obstruction by cable gripping brackets on the end plate (not shown). The extenders provide additional room for working on the cables adjacent the end plate. The extenders can form a modular system by adding additional extenders along the longitudinal axis of the closure.

Figure 13:
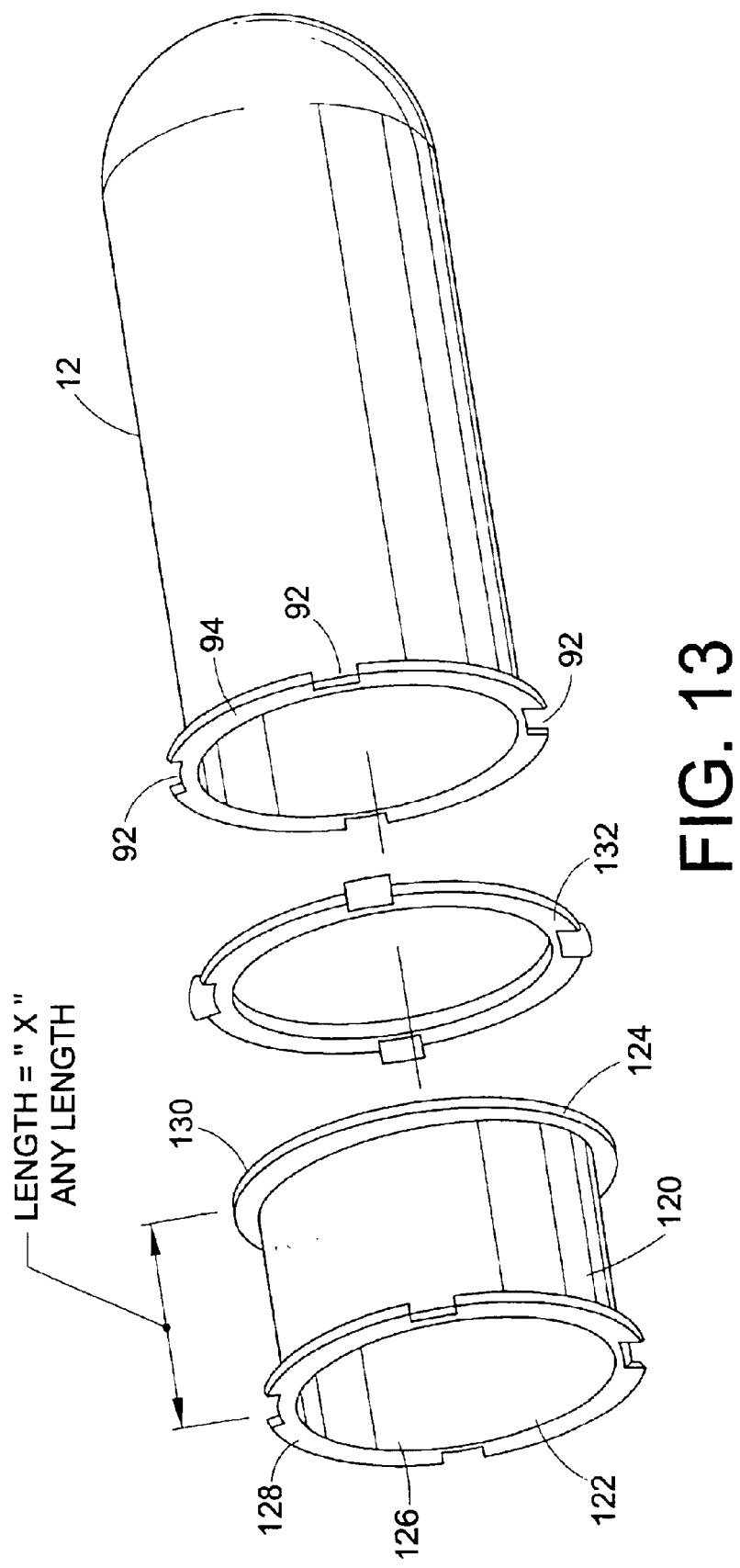
FIG. 13 is a perspective view showing an extender and a dome closure.

With reference now to FIG. 13, a dome shell extender 120 is provided to expand the capacity of the dome inner cavity of the subject closure system. The extender 120 has a first, open end 122, a second, open end 124, a cavity 126 extending therethrough, a first flange 128, and second flange 130. The extender 120 is selectively sealingly locked to the dome 12 with a split one-piece collar 132, or a two-piece collar that can be assembled together around the extender and flange 94 of dome 12. Alternatively, the extender can have a molded-on non-rotatable collar in lieu of flange 130 and which forms a part of the one-piece extender. Thereafter, the original collar 24 and depending end plate 20 with attached splice tray management assembly 16 are selectively sealingly secured to the mating first flange 128 of the extender 120. In the preferred embodiment illustrated, the extender 120 increases the storage capacity of the original dome along a longitudinal axis. It is to be appreciated, however, that the extender may have any length "x" desired along its longitudinal axis as desired. The dome 12 and extender 120 preferably have substantially the same diameter. As seen in FIG. 14, the extender may also have an "L"-shape configuration 140 with a first end 142 and second end 144 which are approximately normal to each other. Alternatively, an "S"-shape, "U"-shape and other shapes (not shown) may be configured and used for different working environments.

It is also contemplated that an existing end plate assembly 14 and attached splice tray management assembly 16 can be used with a second dome 150 having a larger diameter (and hence increased storage capacity) by providing a conical or stepped diameter expander 152 shown in FIG. 15.

The expander has a first body portion 154 having a first diameter 156 and a second body portion 158 having a second diameter 160. The expander has a stepped configuration between the first body portion and the second body portion. The dome 150 has a first body portion 162 with a first diameter 164 which is substantially the same as first diameter 156 of the body portion. The first diameters are larger than the second diameter to allow additional space within the dome for managing and storing fiber optic cable while the second diameter allows interface with existing size end plates.

Rotatable collar 24 and end plate 20 are secured to a flange 159 on an end of the second body portion 158 of the expander. A collar 160 is used to join flanges 161, 163 of the first body portions of the closure and expander. Alternatively, the expander can have a molded-on non-rotatable collar in lieu of flange 161 and which forms a part of a one-piece expander body.

Figure 16:
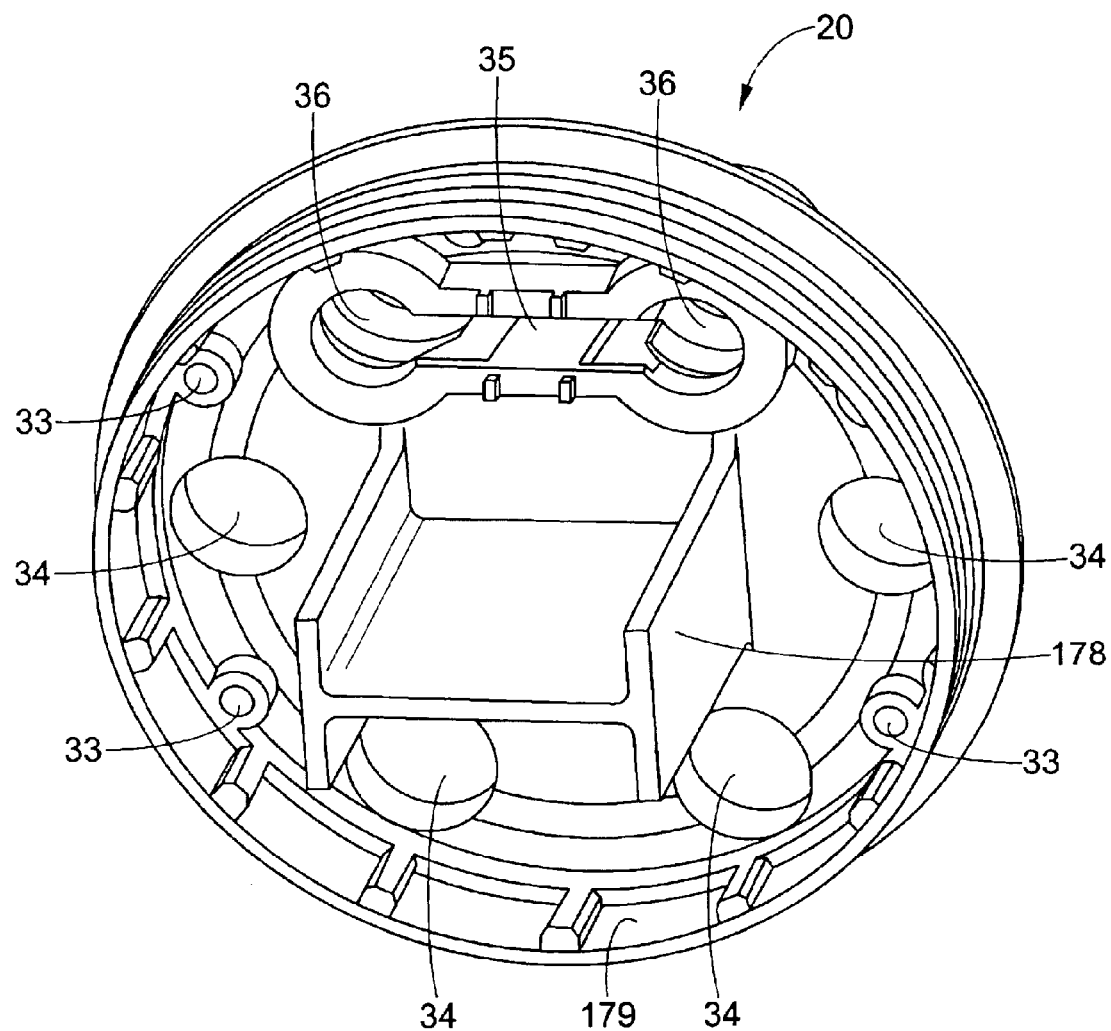
FIG. 16 is a perspective view of the end plate of FIG. 4 showing a bracket extending from a side of the end plate in accordance with the preferred embodiment.

Referring again to FIG. 3, the splice tray management assembly 16 includes a rigid management bar 170, splice tray 172, tray brackets 174 upon which the management bar is mounted, and a tray cover 176. The management bar 170 is secured at one end 177 to a bracket 178 (FIG. 16) which extends from a side 179 of the end plate 20 which faces the internal cavity of the closure. A post 180 extends upwardly from the management bar.

Figure 18B:
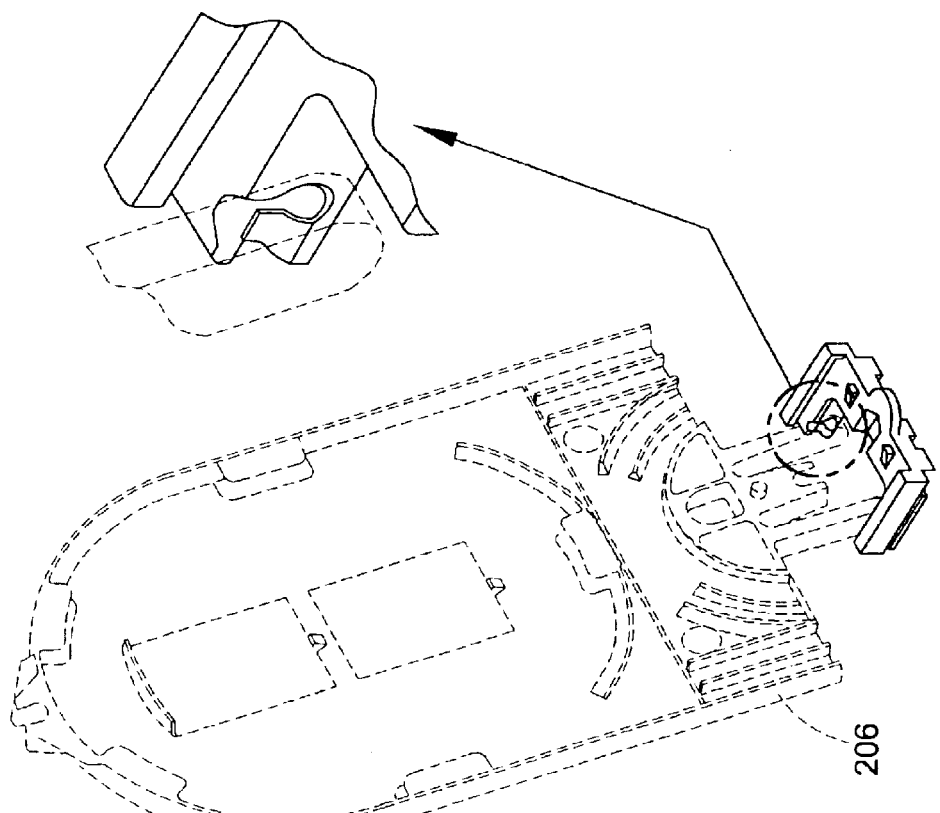
FIG. 18b is a perspective view and an exploded perspective view of a support bracket and a second support bracket in a pivoted position with a fiber optic splice tray (shown in phantom)
Figure 18A:
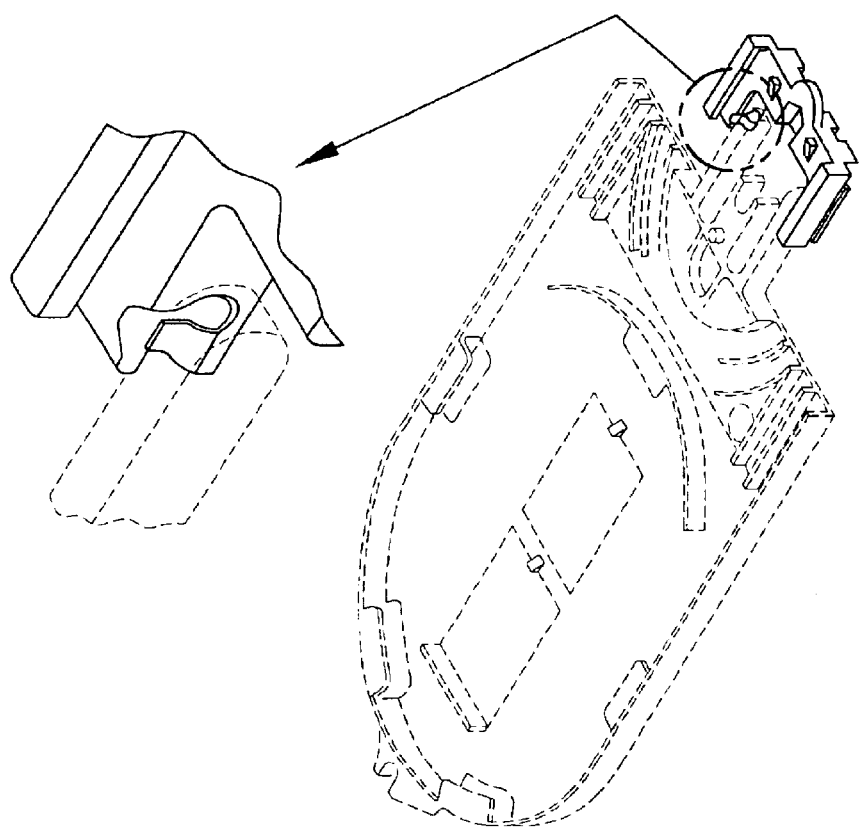
FIG. 18a is a perspective view and an exploded perspective view of a support bracket and a fiber optic splice tray (shown in phantom)

As shown in FIGS. 18A and 18B, the splice trays 172 are adapted to individually slide back from their respective stacked position, and then to be selectively locked in an upwardly-tilted position so as to provide access to the splice tray 172 positioned immediately below the locked and tilted tray. In addition, in the event that insufficient access is gained by tilting one or more of the splice trays 172 as described above, then one or more of the splice trays can be disconnected or otherwise removed from the tray bracket 174 by disengaging the tabs from respective slots as explained below. Thereafter, the one or more splice trays 172 can be pivoted or otherwise moved away from the tray support bracket to gain better access to the desired splice tray.

The brackets 174 are particularly useful to support the superposed splice trays when the assembly is used with buffered cable. FIG. 3 shows the preferred form of the brackets 174 and their relationship to the bar member 170. In particular, each bracket 174 has a general U-shaped configuration with inwardly extending horizontal support portions at the lower ends of the legs. The brackets are joined to the bar member 170 using suitable bolts as shown. The space within the brackets and beneath the bar provides an area for coiling and storing excess lengths of optic cable.

One or more of the splice trays 172 are positioned in stacked relationship above the brackets 174 and bar 170 and function to hold, in an organized manner, the splice connectors and the associated fiber cables. Although the splice trays could have a variety of configurations, the typical and preferred form for the trays in the subject embodiment is shown in FIG. 3. As illustrated therein, the splice tray 172 generally comprises a generally rectangular molded plastic tray member having an outer peripheral size and shape which is rectangular and has a semi-circular end and generally corresponds to the size and shape of the subjacent storage tray. The tray includes a flat bottom wall 173 and an upwardly extending side wall 175. The lower end of the tray has a contoured circular interior wall surface 179 which facilitates the bending of the cable and its positioning as coiled loops within the tray. Associated with the upper interior end of the tray is a raised arcuate wall 181 which also serves to direct the cable and allow it to be suitably coiled neatly about the interior of the tray.

Associated with the bottom wall 173 of the tray are a plurality of upwardly extending resilient webs 183 that extend generally perpendicular to the sides and are preferably formed integrally with the bottom wall to define a multiplicity of upwardly open, transversely extending slots. The spacing between the webs and thus the width of the slots is selected so as to allow the connectors used in forming the splices to be retained therein. These widths can vary at different points along the row of webs so that various commercially available and commonly used connectors can be held in an organized and convenient manner.

The tray is further provided with a flat top or cover 176 which is preferably molded from a clear plastic so as to allow viewing of the interior of the tray when the cover is in a closed position. Many different types of hinge arrangements could be used to allow the cover 176 to be hinged to the tray.

The manner in which the splice trays 172 are engaged with and maintained in stacked relationship on post 180 is best understood by reference to FIGS. 2 and 3. In particular, the trays are each provided with end formations that define outwardly open slots 182. Slots 182 are sized and spaced to receive the threaded post 180. A stack of two or more trays can thus be positioned above and held in aligned stacked relationship thereon by post 180.

An important advantage flowing from the described mounting of trays relative to the post 180 is that lower ones of the trays in the stored stack can be accessed without total removal of superposed trays. Individual selected lower trays can then be pivoted outwardly from between the others in the stack while the other end of the tray remains engaged with the other post. After work within that tray is completed, it can be returned to its located position in the stack merely by reversing the procedure.

Figure 17:
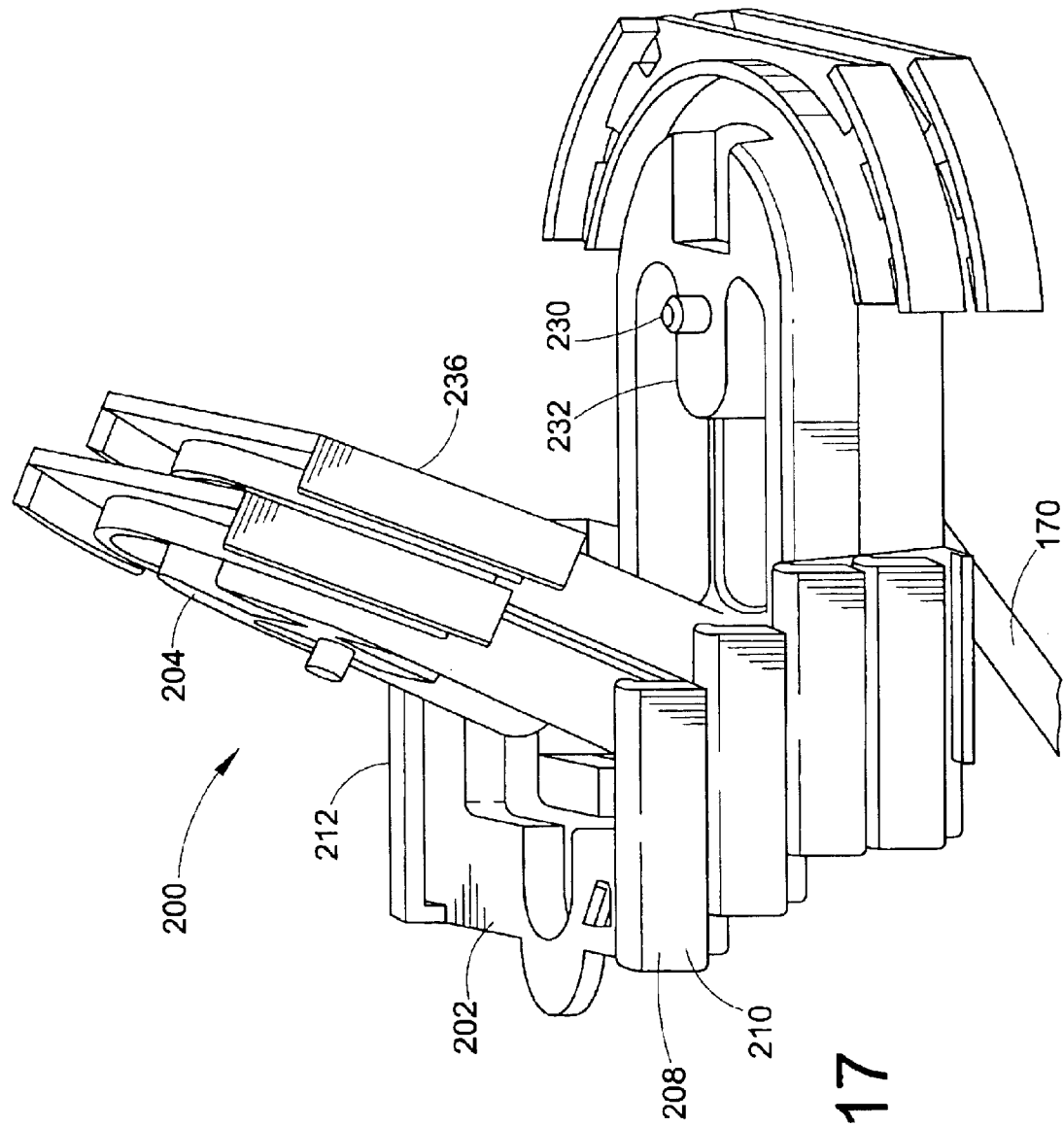
FIG. 17 is a perspective view of a stack of fiber optic splice tray support brackets.
Figure 19:
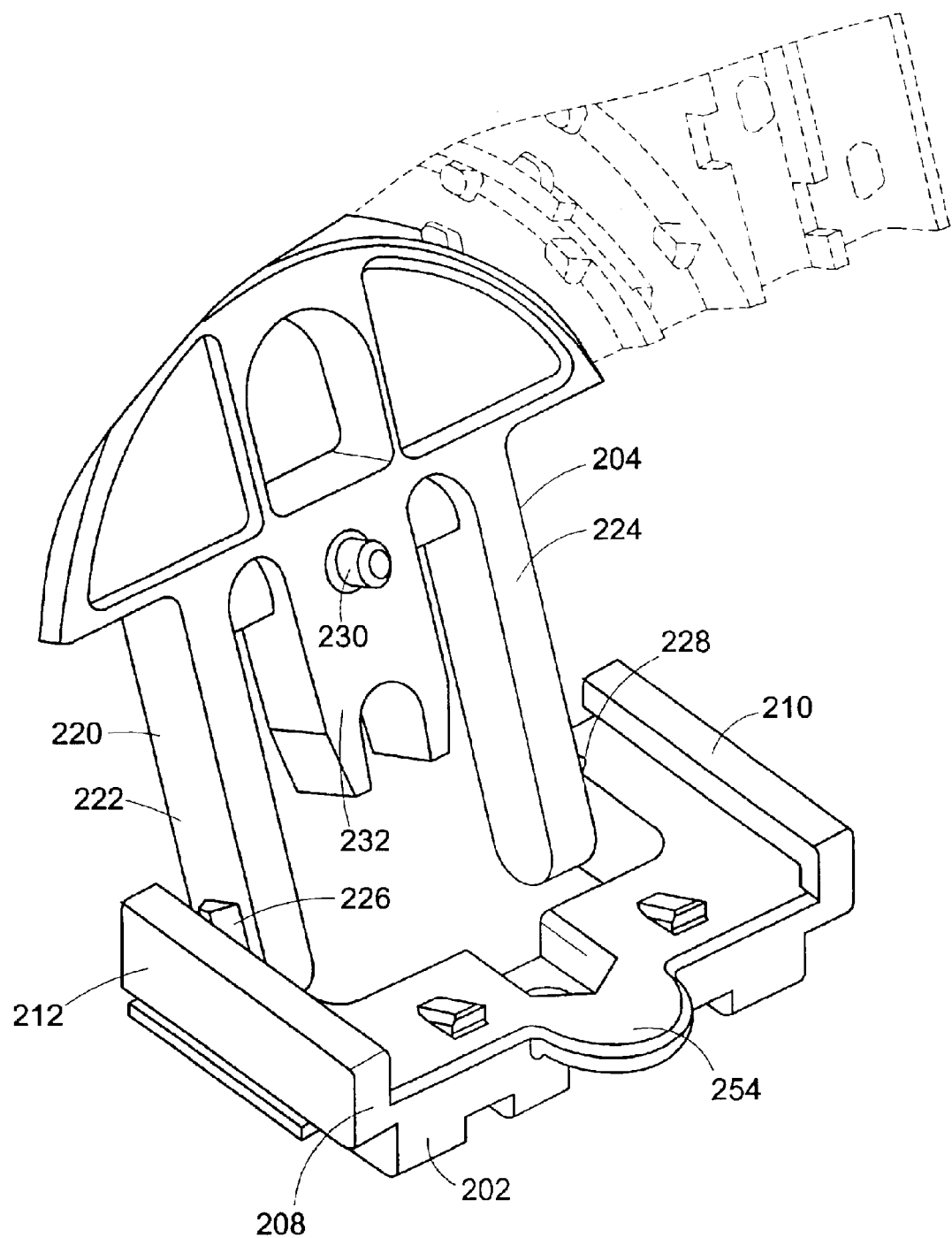
FIG. 19 is a perspective view of a support bracket and a pivoted support bracket and fiber optic splice tray (shown in phantom)

Referring now to FIG. 17, the modular organizer tray system includes a plurality of slidable brackets 200 adapted to be stacked on top of each other. The brackets are preferably made of resilient thermoplastic material. Each bracket is comprised of first and second support members 202, 204 molded from thermoplastic material (FIG. 20A). The second support member is adapted to selectively receive a second end 206 of the one of the splice trays. The first support member is mounted to the rigid bar member and is pivotally connected to the second support member. Referring now to FIG. 19, the first support member has a body 208 with a pair of arms 210, 212 extending therefrom. Referring to FIG. 20a, the arms are generally parallel to each other and each has a first groove 214 and a second groove 216. First groove 214 extends along a longitudinal axis of one of the arms. Second groove 216 extends from the first groove 214 at an acute angle with respect to the longitudinal axis. A circular cut-out or groove 218 is formed at an intersection of the first and second grooves. The second support member 204 has a body 220 and first and second arms 222, 224 extending from the body which are generally parallel to each other. Each of the second support member arms has a tab 226, 228 extending from the side wall of the arms. The tabs are received by the first and second grooves in a corresponding first member arm. The second support member is pivoted from a first, horizontal position (shown in FIG. 18A) to a second, angled position (shown in FIG. 18B) and is locked into the second position by the circular cut-out. The tabs of the arms of the second support member engage the circular cut-outs and lock the second support member in one of the first and second positions.

The second support member each further have a pin 230 on a first surface 232 and a hole (not shown) on a second surface 236 to receive the pin of an adjacent second support member.

Referring to FIGS. 20a and 20b, each of the first support members has a first locking tab 240 on a first surface and a second locking tab 242 on a second surface. The first locking tab of one first support member engages a second locking tab of an adjacent, mating first support member when the first support members are in a first relative stacked relationship to each other. As seen in FIG. 20a–20e, a first locking tab 240 of one of the first support members engages a second locking tab 242 of another of the first support members when the first support members are in a stacked relationship to each other. One of the first support members is slid with respect to the other first support member to disengage the first locking tab from the second locking tab. To slide the first support member, a second support member 204 which is pivotally connected to the first support member is lifted upwardly slightly along with a mating splice tray. Then the splice tray, second support member and first support member are pulled so the first support member is freed and slidable relative to an adjacent first support member.

The first locking tab 240 has a ramped surface 244 and a straight vertical surface 246 extending from the ramped surface. The second locking tab 242 has a ramped surface 248, a landing 250 and a straight vertical surface 252 which extends from and is approximately normal to the landing. The first locking tab slides over the second locking tab as shown in FIG. 20a while moving to a closed position, i.e., when the splice trays are in alignment as shown in FIG. 2. The tabs contact each other and prevent movement beyond the closed position of FIG. 20b. However, movement toward the open position of FIG. 20c and FIG. 17 is accomplished by lifting the splice tray and a second support member pivotally attached to the first support member and pulling the first support member by a tab 254 which extends from the body for manually gripping the first support member. This allows the user to grab the first support member and pull it to either the closed or open positions.

In the closed position, each of the second support members 204 are aligned with each other and are stacked one on top of the other as seen in FIG. 2.

To pivot the second support member 204 to an inclined position, to allow access to lower splice trays, the splice tray and second support member are lifted, then one of the adjoining first support members 202 is slid forward to disengage the locking tabs 240, 242 as seen in FIG. 20C. Member 204 is then tilted upwardly at an angle and is locked into an angled or inclined position by each tab 226, 228 arm engaging curved slots 218 in member 202. To release the member 204 from its inclined position, it is slightly pulled forward and downwardly to release engagement of the arm from the cut-out slot, and then the member is pulled to a horizontal position as seen in FIG. 2. First support member 202 is slid with respect to an adjacent first support member to the closed position of FIG. 20b until locking tabs 240, 242 contact each other.

The tray brackets are also removable from each other. Sides of members 204 are squeezed or slightly compressed and are removable from each other by releasing the tabs 226, 228 from engagement with slots 214, 216. The splice tray and brackets are also rotatable with respect to the management bar 170 as seen in FIG. 17.

An alternative embodiment is shown in FIGS. 21a–21d. First support members 260, 262 each have a slot 264 which extends along the longitudinal axis of the arms and a rib 266 extending along the longitudinal axis of each of the arms. The rib 266 is spaced apart from the slot 264. The rib of one of the support members slidably engages the slot of the adjacent first support member when the members are in a stacked relationship as seen in FIGS. 21a and 21b. The slot of the first support member further has an end wall 268 where the rib 266 of a first support member contacts the end wall to prevent further movement of the rib within the slot as seen in FIG. 21c. As seen in FIGS. 21a and 21b, the rib slides horizontally within the slot until it contacts the end wall and prevents further movement of the top support member with respect to the bottom support member. As the support members are moved to an open position of FIGS. 21c and 21d, to allow tilting of the splice tray for accepting other trays, the slot is moved out of engagement with the stop tab.

To move the first support member 260 to an open position of FIG. 21b from the closed position of FIG. 21a, a corresponding splice tray and second member which are pivotally attached to the first support member are lifted from a horizontal position. Then, first support member 260 is pulled forward until rib 266 contacts end wall 268 of slot 264 of a first support member 262 which is positioned directly underneath first support member 268. Then, the second support member and splice tray are pivoted and locked in an inclined position as described above for the FIGS. 20a–20d.

To return the first support member 260 to a closed position, the second support member and splice tray are pulled slightly forward and downwardly to disengage the second support member from a locked configuration with the first support member lower then to a horizontal position as described for FIGS. 20a–20d. Then, the second support member, splice tray and first support member are pulled to the closed position until the first support members are in alignment as shown in FIG. 21a. Then, the second support member and splice tray are lowered to a horizontal and aligned position of FIG. 2.

Referring now to FIGS. 20D and 20E, the first support member arm has a first wall 270 and a second wall 272 which are parallel to each other and a third wall 274 and a fourth wall 276 which are also parallel to each other. The third and fourth walls are approximately normal to the first and second walls. In a stacked relationship, the first wall 270 of a first support member engages a second wall of the adjacent first support member. The third wall 274 of the first support member engages the fourth wall 276 of the adjacent first support member. This is shown in FIG. 20E.

Loose cable tubes are looped or wrapped around a cable "fanged"-shape bracket 300 shown in FIGS. 3 and 22a and 22b. The "fang" bracket secures the wrapped cable fibers within the organizer tray. The fibers are wrapped around a curved, resilient wall. The bracket contains the cable between flexible, resilient prongs and the curved wall. The top wall and bottom wall each have arms or extensions through which the cable is wrapped. The arms serve to abut the inner wall of the dome closure. The "fang"bracket is mounted onto one end of the management bar. The bracket also serves as a leg for supporting one end of the splice tray system.

Specifically, the fang bracket includes an opening 302 for receiving one end of the rigid bar member 170. The bracket has first and second walls 304, 306 which are generally parallel to each other. The second wall 306 forms a base for the bracket. A third substantially vertical wall 308 connects the first and second walls to each other. A pair of prongs 310, 312 extend downwardly from the first wall and another prong 314 extends upwardly from the second wall. Preferably, the third wall 308 has a curved surface to accommodate the wrapping of cable around it. The prongs 310, 312, 314 of the first wall and second wall are substantially parallel to each other and are formed of resilient thermoplastic material to allow slight bending or resilience of the prongs to accommodate various sizes of cable. The prongs can also be curved or form curved walls for receiving cable. The bracket is further used as a leg to support the rigid bar member and splice tray in a vertical direction. Cable is wrapped around the fang bracket through and between the curved wall 308 and the prongs 310, 312, 314 which retain the cable and allow wrapping around the bracket as well as maintaining the cable.

This invention has been described with reference to the preferred embodiments. Obviously, alterations and modifications will occur to others upon a reading and understanding of the specification. It is intended to include all such modifications and alterations insofar as they come within the scope of the appended claims or the equivalents thereof.

Having thus described the preferred embodiments, the invention is now claimed to be:

1. A cable splice closure apparatus comprising:
   an elongated generally cylindrical housing having an open first end, a second end, and a flange at the first end;
   an end plate releasably secured to said open end of said housing;
   a bar member having opposite terminal ends wherein one of said ends is adapted to connect with said end plate;
   at least one cable splice tray carried on said bar member; and,
   a rotatable collar matingly engagable with said flange, said collar being adapted to releasably connect said end plate with said housing first end.

2. The closure apparatus of claim 1 further comprising:
   a seal member between said flange and said end plate to seal said first end of said housing.

3. The closure apparatus of claim 1 wherein:
   said collar further includes a plurality of circumferentially spaced tabs; and, said flange includes a plurality of spaced apart notches, said tabs being adapted to align with and engage said notches when the collar and flanges are brought together in an intermated relationship.

4. The closure apparatus of claim 3 wherein said tabs of said collar each comprises a body and a leg extending from said body, said collar being rotatable relative to said flange until a notch of said flange is positioned between said body and said leg of said tab, thereby locking said collar to said flange.

5. A cable splice closure apparatus comprising:
an elongated generally cylindrical housing having an open first end, a second end, and a flange at the first end;
an end plate releasably secured to said open end of said housing;
a bar member having opposite terminal ends wherein one of said ends is adapted to connect with said end plate;
at least one cable splice tray carried on said bar member;
a rotatable collar matingly engagable with said flange, said collar being adapted to releasably connect said end plate with said housing first end, said collar further including a plurality of circumferentially spaced tabs;
said flange including a plurality of spaced apart notches, said tabs being adapted to align with and engage said notches when the collar and flanges are brought together in an intermated relationship;
said tabs of said collar each including a body and a leg extending from said body, said collar being rotatable relative to said flange until a notch of said flange is positioned between said body and said leg of said tab, thereby locking said collar to said flange, said collar further including a plurality of ridges adapted to engage a circumferential edge of said end plate to retain said end plate to said collar.

6. The closure apparatus of claim 5, wherein said end plate is selectively rotatable relative to said housing while loosely held by said collar.

7. The closure apparatus of claim 6, wherein said tabs are spaced apart substantially uniformly along a circumference of said collar.

8. The closure apparatus of claim 7, wherein said notches of said flange of said housing are spaced apart substantially uniformly along a circumference of said flange.

9. The closure apparatus of claim 1, wherein said end plate includes a plurality of ports for receiving associated fiber optic cables.

10. The closure apparatus of claim 5, wherein said tabs of said collar each further includes a second leg, wherein said second legs and said ridges form channels for receiving said edge of said end plate.

11. The closure apparatus of claim 1, wherein said housing defines a closed end dome having a plurality of radially extending ribs formed on an outer surface thereof.

12. A cable closure system comprising:
a first generally cylindrical housing member defining a cavity having an open first end, and a closed second end;
a second housing member having a first open end, a second open end, and a cavity extending therebetween, said second housing member first end being adapted to selectively sealingly couple with said first housing member;
a collar adapted to engage and secure said second housing member with said first housing member;
an end plate secured to said second housing member second end;
a bar member having opposite terminal ends wherein one of said ends is joined to said end plate; and,
at least one cable splice tray mounted on said bar member.

13. The closure system of claim 12, wherein said second housing member extends generally along a longitudinal axis of said first housing member.

14. The closure system of claim 13, wherein said first housing member and said second housing member have substantially the same diameter.

15. The closure system of claim 14, wherein each of said housing members includes a first flange, said first flanges being selectively intermatably connected with each other.

16. The closure system of claim 15, wherein said second housing member further includes a second flange on said second end opposite to said second housing first flange.

17. The closure system of claim 12, further including a second collar rotatably secured to said second end of said second housing.

18. The closure system of claim 12, wherein said second housing includes a body having a first end and a second end, said body being shaped in a substantially L-shaped configuration, wherein said first end and said second end are substantially perpendicular to each other.

19. The closure system of claim 12, wherein said second housing member includes a body having a first end and a second end, wherein said body is substantially U-shaped and said first and second ends are substantially parallel to each other.

20. The closure system of claim 12, wherein said first and second housings each includes a first body portion having a first diameter, said first diameters are substantially the same, and wherein said second housing further includes a second body portion having a second diameter, said second housing having a stepped configuration formed between said second housing first and second body portions, wherein said first diameter is larger than said second diameter.

21. The closure system of claim 20, wherein said end plate is secured to an end of said second housing adjacent said second body portion of said second housing member.

22. The closure system of claim 12, wherein said first housing includes a dome having a plurality of radially extending ribs formed on an outer surface thereof.

23. An end plate assembly for use with a fiber optic splice closure comprising:
an end plate including a plurality of drop ports for use with associated cut cable and a plurality of express ports for use with associated uncut cable, said drop ports each include webbed material covering an opening of each of said ports;
at least one ground wire port for connection with an associated grounding wire;
a plurality of grommets selectively received into said drop and express ports to provide a seal between the associated cable and inner wall surfaces of said drop and express ports;
a plurality of caps selectively connectable with said ports to secure said grommets into place;
a slot formed between and connecting adjacent express ports, the slot accommodating passage of an associated looped uncut cable portion through said end plate; and,
a wedge-shaped insert disposed in said slot to retain said looped uncut cable portion within said closure.

24. An end plate assembly for use with a fiber optic splice closure comprising:
an end plate including a plurality of drop ports for use with associated cut cable and a plurality of express ports for use with associated uncut cable, said drop ports each include webbed material covering an opening of each of said ports;

at least one ground wire port for connection with an associated grounding wire;

a plurality of grommets selectively received into said drop and express ports to provide a seal between the associated cable and inner wall surfaces of said drop and express ports;

a plurality of caps selectively connectable with said ports to secure said grommets into place;

a slot formed between and connecting adjacent express ports, the slot accommodating passage of an associated looped uncut cable portion through said end plate; and, a wedge-shaped insert disposed in said slot to retain said looped uncut cable portion within said closure, wherein said wedge-shaped insert is keyed to facilitate locking of said wedge-shaped insert within said slot.

25. An end plate assembly for use with a fiber optic splice closure comprising:

an end plate including a plurality of drop ports for use with associated cut cable and a plurality of express ports for use with associated uncut cable, said drop ports each include webbed material covering an opening of each of said ports;

at least one around wire port for connection with an associated grounding wire;

a plurality of grommets selectively received into said drop and express ports to provide a seal between the associated cable and inner wall surfaces of said drop and express ports;

a plurality of caps selectively connectable with said ports to secure said grommets into place;

a slot formed between and connecting adjacent express ports, the slot accommodating passage of an associated looped uncut cable portion through said end plate; and, a wedge-shaped insert disposed in said slot to retain said looped uncut cable portion within said closure, wherein said caps include a first and second intermatable semicircular sections, wherein said first section includes a pair of grooves extending along a longitudinal axis of said first section, said second section includes a pair of ribs extending along a longitudinal axis of said second section, said grooves and said ribs slidingly engage each other to connect said first section to said second section and allow said cap to be installed over an associated cable.

26. The end plate assembly of claim 23, wherein said grounding wire ports include webbed material within an opening thereof.

27. An end plate assembly for use with a fiber optic splice closure in combination with a cap tool, the combination comprising:

an end plate including a plurality of drop ports for use with associated cut cable and a plurality of express ports for use with associated uncut cable, said drop ports each include webbed material covering an opening of each of said ports;

at least one ground wire port for connection with an associated grounding wire;

a plurality of grommets selectively received into said drop and express ports to provide a seal between the associated cable and inner wall surfaces of said drop and express ports;

a plurality of caps selectively connectable with said ports to secure said grommets into place;

a slot formed between and connecting adjacent express ports, the slot accommodating passage of an associated looped uncut cable portion through said end plate; and, a wedge-shaped insert disposed in said slot to retain said looped uncut cable portion within said closure, the cap tool comprising a first body member and a second body member, each member having a first end and a second end, said first end having a plurality of teeth and said second end forming a handle, said first body member having at least one groove and said second body member comprising at least one rib which matingly engages said groove, said rib and said groove releasably secure said first body member to said second body member to allow said cap driver to be installed over a cable.

28. The end plate assembly of claim 27, wherein said cap further includes a plurality of ribs formed on an outer surface of said first and second cap halves, said cap tool teeth selectively engaging said ribs and allowing rotation of said cap within one of said ports.

29. An end plate assembly for use with a fiber optic splice closure comprising:

an end plate including a plurality of drop ports for use with associated cut cable and a plurality of express ports for use with associated uncut cable, said drop ports each include webbed material covering an opening of each of said ports;

at least one around wire port for connection with an associated grounding wire;

a plurality of grommets selectively received into said drop and express ports to provide a seal between the associated cable and inner wall surfaces of said drop and express ports;

a plurality of caps selectively connectable with said ports to secure said grommets into place;

a slot formed between and connecting adjacent express ports, the slot accommodating passage of an associated looped uncut cable portion through said end plate;

a wedge-shaped insert disposed in said slot to retain said looped uncut cable portion within said closure;

a grommet driver having a first half and a second half, said first half having at least one groove and said second half having at least one corresponding rib, said groove and rib being selectively matingly engaged to releasably secure said grommet driver first half to said grommet driver second half to install said grommet driver over an associated cable.

30. The end plate assembly of claim 23, further including a bracket extending from a surface of said end plate adjacent a cavity of said closure.

31. The end plate assembly of claim 23, further including a sealing ring which surrounding a perimeter of said end plate and sealing said end plate with said closure.

32. The end plate assembly of claim 26 in combination with a webbed material removal tool for removing said webbed material from said drop ports and ground wire ports.

33. The end plate assembly of claim 32, wherein said removal tool includes a tip which engages said webbed material and reduces force required to remove said webbed material from said ports.

34. A splice tray and splice tray support system comprising:

an elongate rigid bar member;

a post extending substantially perpendicularly from the bar member;

a set of tray support brackets upon which the rigid bar member is mounted;

at least one splice tray supported on the bar member, said tray having a first end with a slot adapted to selectively receive said post;

a first support member mounted to said rigid bar member;

a second support member adapted to selectively receive a second end of said at least one splice tray, said second support member being pivotably connected to said first support member;

wherein said first support member includes a body with a pair of spaced arms extending therefrom, said arms being generally parallel to each other, each of said arms including a first groove and a second groove, said first groove extending along a longitudinal axis of one of said arms, said second groove extending from said first groove at an acute angle relative to said longitudinal axis;

a circular cutout formed at an intersection of said first and second grooves;

said second support member including a body and first and second arms extending from said body generally parallel to each other;

each of said second support member arms including a tab extending from a side wall of said arm, said tabs being selectively received by one of said first and second grooves in a corresponding one of said first member first and second arms; and, wherein said second support member is selectively pivotable from a first, horizontal rest position to a second, angled locked position.

35. The splice tray and splice tray system of claim 34, wherein said tabs of said arms of said second support member engage said circular cutouts and lock said second support member in one of said first and second positions.

36. The splice tray and splice tray support system of claim 34, further comprising:

a plurality of stacked splice trays and a plurality of stacked first and second support members.

37. The splice tray and splice tray support system of claim 34, wherein second support members each comprise a pin on a first surface and a hole on a second surface adapted to receive a pin of an adjacent said second support member.

38. The splice tray and splice tray system of claim 37, wherein each of said first support members includes a first locking tab on a first surface and a second locking tab on a second surface.

39. The splice tray and splice tray system of claim 38, wherein said first locking tab of one of said first support members engages said second locking tab of another of said first support members when said first support members are in a stacked relative relationship.

40. The splice tray and splice tray support system of claim 39, wherein one of said first support members is slidable relative to the other of said first support members to disengage said first locking tab of one of first support members from said second locking tab of the other of said first support members.

41. The splice tray and splice tray support member of claim 37, wherein said first locking tab includes a ramp surface and a straight vertical surface extending from said ramp surface.

42. The splice tray and splice tray support tray system of claim 41, wherein said second locking tab includes a ramp surface, a landing and a straight, vertical surface extending from and approximately normal to said landing.

43. The splice tray and splice tray support system of claim 34, wherein each of said first support members includes a tab extending from said body providing a manual grip area on said first support member.

44. The splice tray and splice tray support system of claim 34, wherein each of said first support members includes a slot extending along a longitudinal axis of each of said arms and a rib extending along said longitudinal axis of each of said arms, said rib being spaced apart from said slot.

45. The splice tray and splice tray support system of claim 44, wherein said rib of one of said first support members slidably engages said slot of another of said first support members when said first support members are in a stacked relationship.

46. The splice tray and splice tray support system of claim 45, wherein said slot of said first support member includes an end wall, wherein said rib of another of said first support members contacts said end wall to prevent further movement of said rib within said slot.

47. The splice tray and splice tray support system of claim 34, wherein said first support member arm includes a first and second parallel walls, and third and fourth parallel walls, wherein said third and said fourth wall are approximately normal to said first and second walls.

48. The splice tray and splice tray support system of claim 47, wherein said first wall of one of said first support members engages said second wall of said other of said first support members and said third wall of said one of said first support members engages said fourth wall of said other of said first support members when said first support members are in a relative stacked configuration.

49. A splice tray and splice tray support system comprising:

an elongate rigid bar member;

a post extending from the bar member;

a set of tray support brackets upon which the rigid bar member is mounted;

at least one splice tray supported on the bar member, the at least one tray having a first end with a slot for selectively receiving said post;

a bracket having an opening for receiving one end of said rigid bar member;

said bracket having first and second walls generally parallel to each other, wherein said second wall forms a base for said bracket;

a third substantially vertical wall connecting said first wall to said second wall;

at least one prong extending downwardly from said first wall; and, at least one prong extending upwardly from said second wall.

50. The splice tray and splice tray support system of claim 49, wherein said third wall has a curved surface.

51. The splice tray and splice tray support system of claim 49, wherein said prong of said first wall and said prong of said second wall are substantially parallel to each other.

52. The splice tray and splice tray support system of claim 50, wherein said prongs of said first and second walls are formed of a resilient thermoplastic material.

53. The splice tray and splice tray support system of claim 50, wherein said first wall includes a pair of prongs generally parallel to each other.

54. The splice tray and splice tray support system of claim 52, wherein said pair of prongs each includes a curved wall.

55. The splice tray and splice tray support system of claim 49, wherein said bracket supports said rigid bar member in a vertical direction.

56. A cable closure comprising:

a first generally cylindrical housing member having an opening at a first end, a closed second end, and a cavity extending therebetween;

an end plate secured to said housing member first end;

a bar member having opposite terminal ends wherein one of said ends is joined to said end plate;

a bracket for securing an associated strength member to said closure; and, an extender selectively connectable with said bracket to allow said bracket to accommodate various lengths of strength members.

57. The cable closure of claim 56, wherein said extender includes a first portion and a second portion extending from and approximately normal to said first portion.

58. The cable closure of claim 57 wherein said first portion compresses an elongate slot to receive a fastening member to secure said extender to said end plate.

59. The cable closure of claim 57, wherein said second portion includes a flange which is adapted for extending through a slot of said strength member bracket.

60. The cable closure of claim 57, wherein said second portion includes a flange adapted to cooperate with an end of said strength member bracket.

61. A cable closure comprising:

a first generally cylindrical housing member having an opening at a first end, a closed second end, and a cavity extending therebetween;

an end plate secured to said housing member first end;

a bar member having opposite terminal ends wherein one of said ends is joined to said end plate;

a bracket for securing an associated strength member to said closure; and, an extender selectively connectable with said bracket to allow said bracket to accommodate various lengths of strength members, wherein said extender is adapted for installation on said strength member bracket in one of a first position and a second position, wherein said first and second positions are substantially 180° apart.

62. An end plate assembly to be used with a fiber optic splice closure comprising:

an end plate including a plurality of drop ports for use with associated cut cable and a plurality of express ports for use with associated uncut cable;

at least one ground wire port for receiving associated grounding wire;

a gel wrap carried around associated cables to provide a seal between said express ports, drop ports and ground wire port; and, a slot formed between and connecting adjacent express ports adapted to receive an associated looped uncut cable portion through said end plate.

63. The end plate assembly of claim 62, further including a wedge shaped insert which is inserted into said slot to retain said looped uncut cable portion within said closure.

* * * * *